(12) United States Patent
Galloway

(10) Patent No.: US 10,718,358 B2
(45) Date of Patent: Jul. 21, 2020

(54) MANUFACTURING SOFT DEVICES OUT OF SHEET MATERIALS

(71) Applicant: President and Fellows of Harvard College, Cambridge, MA (US)

(72) Inventor: Kevin C. Galloway, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 101 days.

(21) Appl. No.: 15/984,580

(22) Filed: May 21, 2018

(65) Prior Publication Data

US 2019/0024679 A1     Jan. 24, 2019

Related U.S. Application Data

(63) Continuation of application No. 14/502,241, filed on Sep. 30, 2014, now Pat. No. 10,001,149.

(Continued)

(51) Int. Cl.
| | | |
|---|---|---|
| *F15B 15/10* | (2006.01) | |
| *B25J 15/00* | (2006.01) | |
| *B25J 15/10* | (2006.01) | |
| *B25J 15/08* | (2006.01) | |
| *B25J 15/12* | (2006.01) | |
| *B25J 9/14* | (2006.01) | |

(52) U.S. Cl.
CPC .............. *F15B 15/10* (2013.01); *B25J 9/142* (2013.01); *B25J 15/0023* (2013.01); *B25J 15/08* (2013.01); *B25J 15/10* (2013.01); *B25J 15/12* (2013.01); *F15B 15/103* (2013.01); *Y10T 156/10* (2015.01)

(58) Field of Classification Search
CPC .............................. F15B 15/10; F15B 15/103
See application file for complete search history.

(56) References Cited

U.S. PATENT DOCUMENTS

| | | | |
|---|---|---|---|
| 766,820 A * | 8/1904 | Fulton ................... | F15B 15/103 92/39 |
| 4,948,107 A * | 8/1990 | Orndorff, Jr. ........... | F15B 15/10 254/93 HP |

(Continued)

FOREIGN PATENT DOCUMENTS

| | | |
|---|---|---|
| DE | 19617852 A1 | 10/1997 |
| EP | 1319845 A2 | 6/2003 |

(Continued)

OTHER PUBLICATIONS

European Search Report issued in application No. 14851387.2, dated Jun. 6, 2017, 22 pages.

(Continued)

*Primary Examiner* — Michael Leslie
(74) *Attorney, Agent, or Firm* — Wilmer Cutler Pickering Hale and Dorr LLP

(57) ABSTRACT

A soft composite actuator is described, including a first elastomeric layer; a strain limiting layer; and a first radially constraining layer, wherein the first elastomeric layer is disposed between the first radially constraining layer and the strain limiting layer; and the elastomeric layer, the strain limiting layer, and the radially constraining layer are bonded together to form at least one bladder for holding pressurized fluid. Methods of using and making of the soft composite actuator are described.

14 Claims, 25 Drawing Sheets

Related U.S. Application Data

(60) Provisional application No. 61/885,092, filed on Oct. 1, 2013.

(56) References Cited

U.S. PATENT DOCUMENTS

| | | | |
|---|---|---|---|
| 4,976,191 A | 12/1990 | Suzumori et al. | |
| 5,568,957 A | 10/1996 | Haugs | |
| 6,684,754 B2 * | 2/2004 | Comer | F15B 15/103 901/21 |
| 7,258,379 B2 | 8/2007 | Ono et al. | |
| 8,475,612 B2 | 7/2013 | Gaudin | |
| 8,490,918 B2 | 7/2013 | Fukui | |
| 9,956,745 B2 * | 5/2018 | Galloway | B32B 15/08 |
| 10,001,149 B2 * | 6/2018 | Galloway | F15B 15/103 |
| 2002/0157388 A1 | 10/2002 | Seto et al. | |
| 2011/0198019 A1 | 8/2011 | Tilson et al. | |

FOREIGN PATENT DOCUMENTS

| | | |
|---|---|---|
| GB | 1512703 A | 6/1978 |
| JP | 2006-000294 A | 1/2006 |
| JP | 2006204612 A | 8/2006 |
| WO | WO-2005/000538 A1 | 1/2005 |
| WO | WO-2012/148472 A2 | 11/2012 |
| WO | WO-2012150551 A1 | 11/2012 |
| WO | WO-2013015503 A1 | 1/2013 |
| WO | WO-2013/110086 A1 | 7/2013 |

OTHER PUBLICATIONS

International Search Report and Written Opinion for International Application No. PCT/US14/58244 dated Jan. 2, 2015. 11 pages.

* cited by examiner

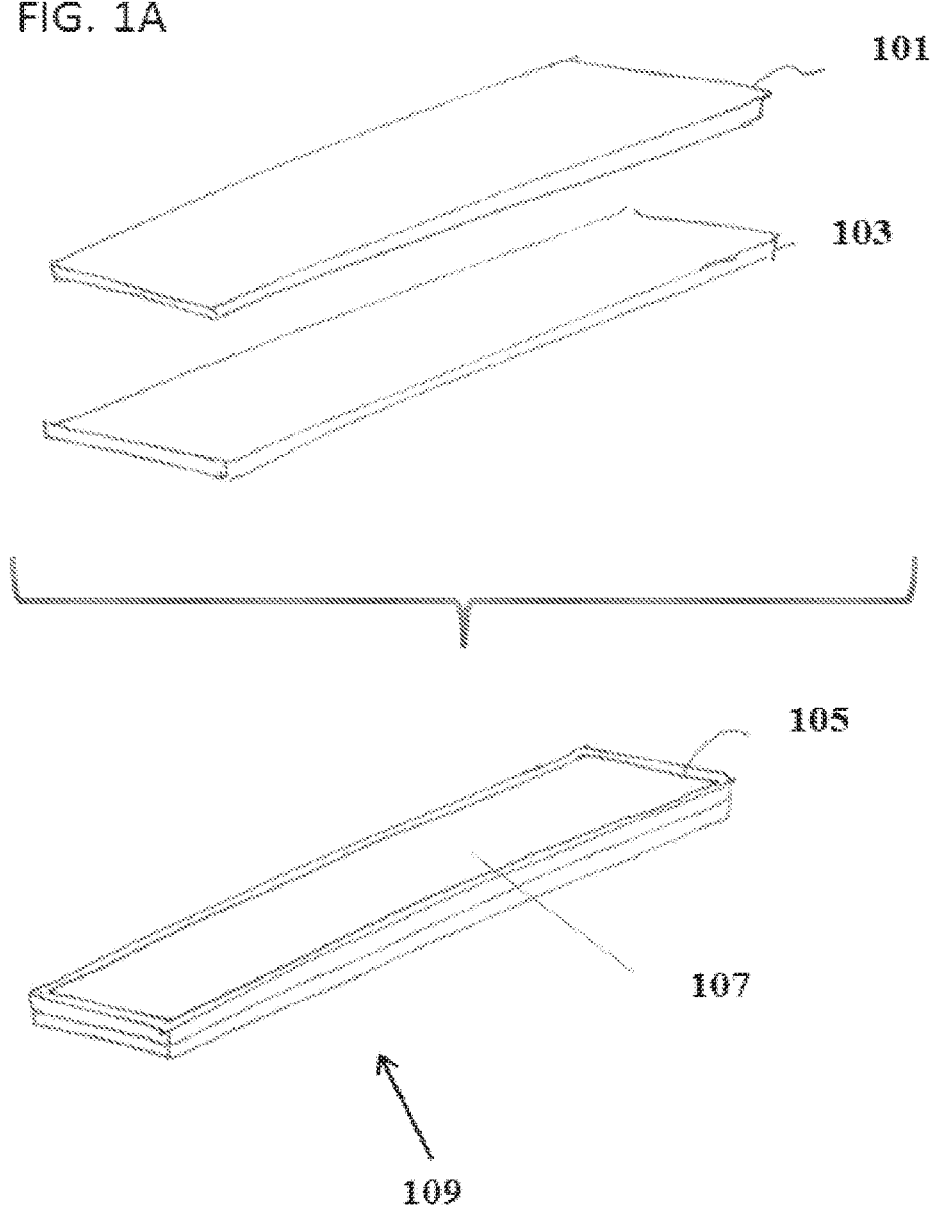

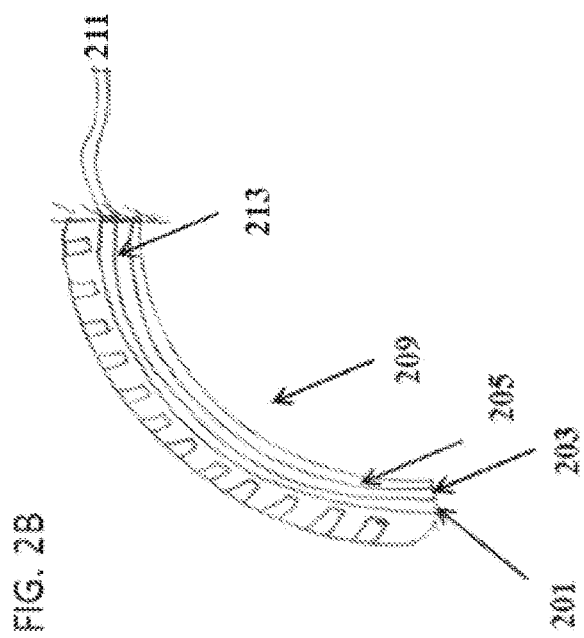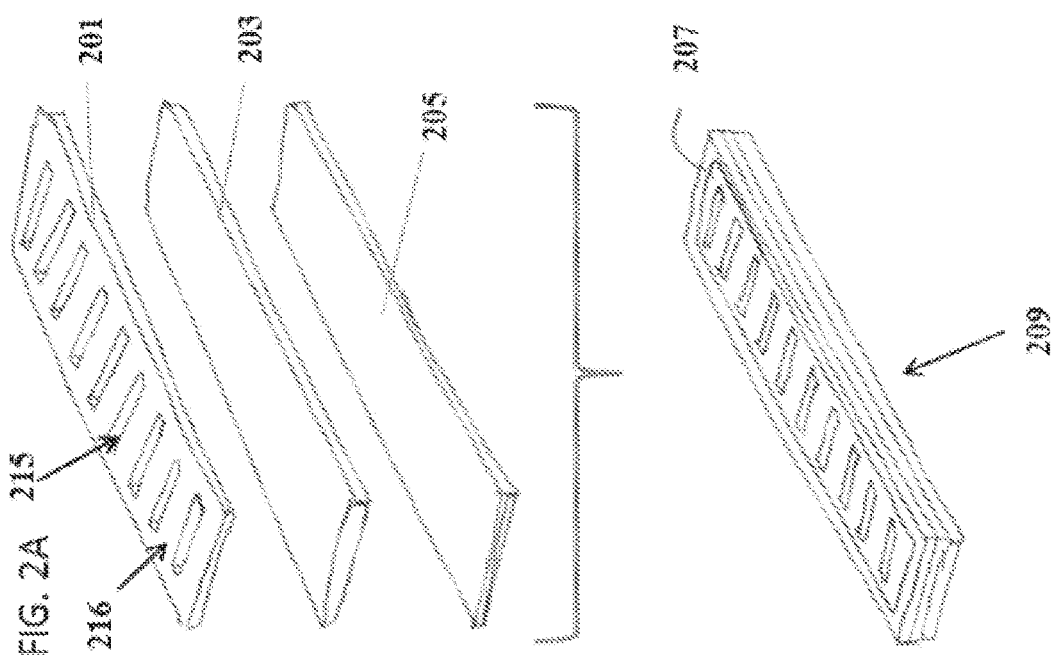

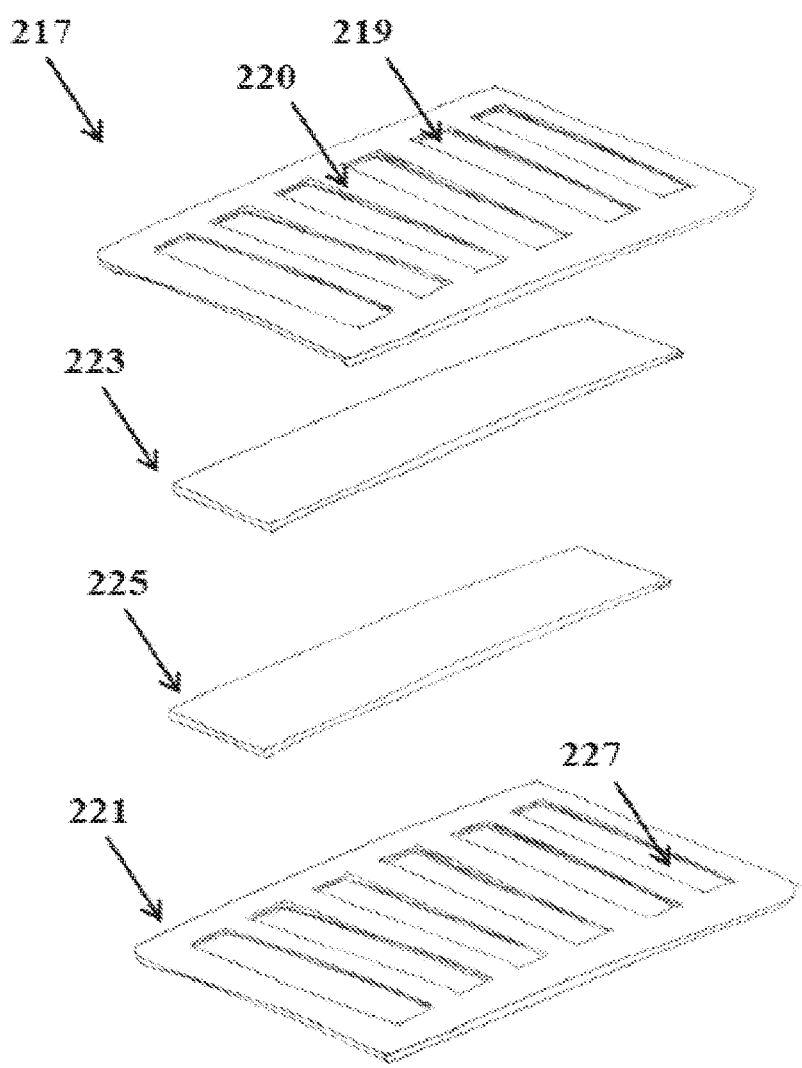

FIG. 2D
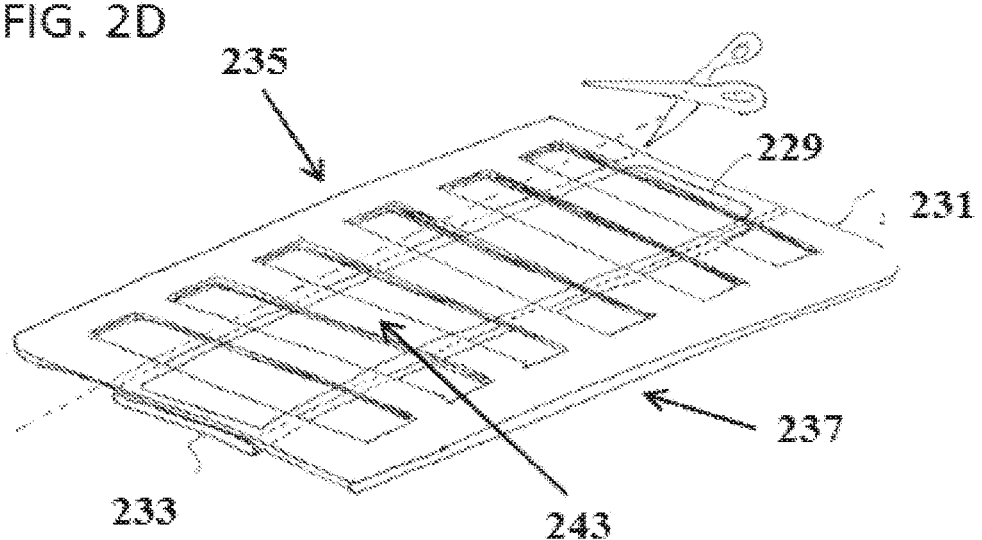
FIG. 2E
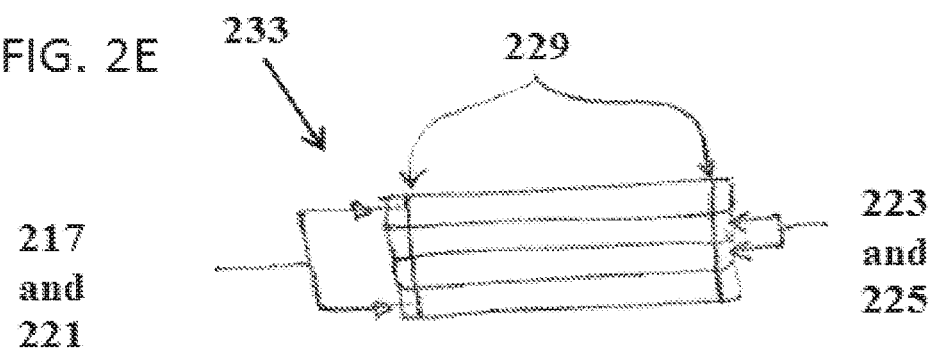
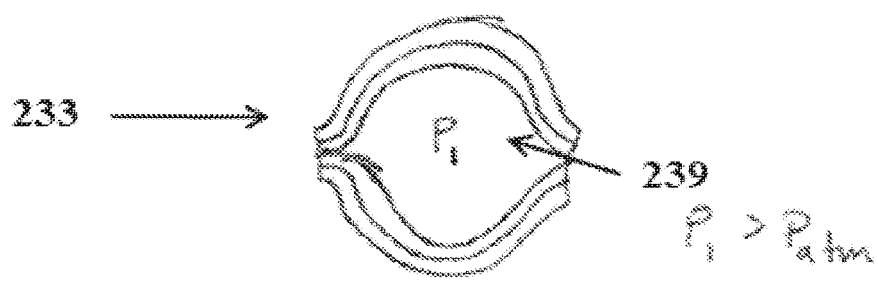
$P_i > P_{atm}$

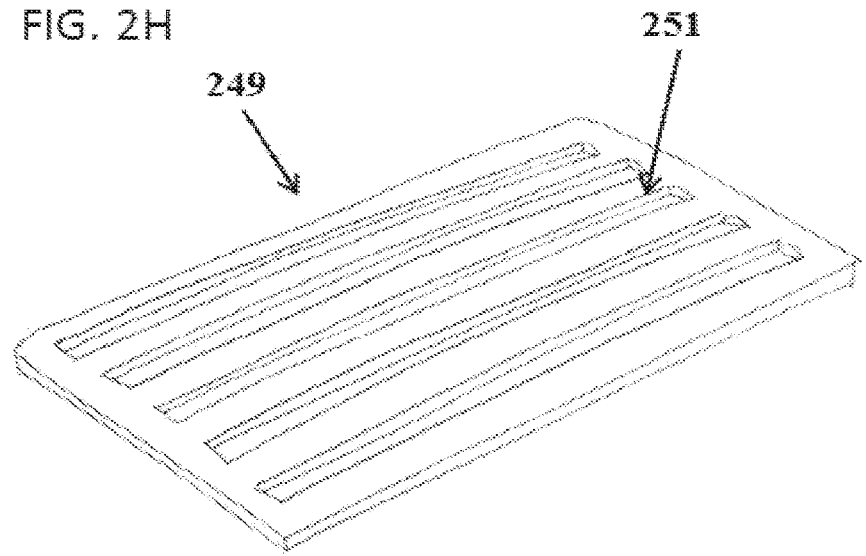
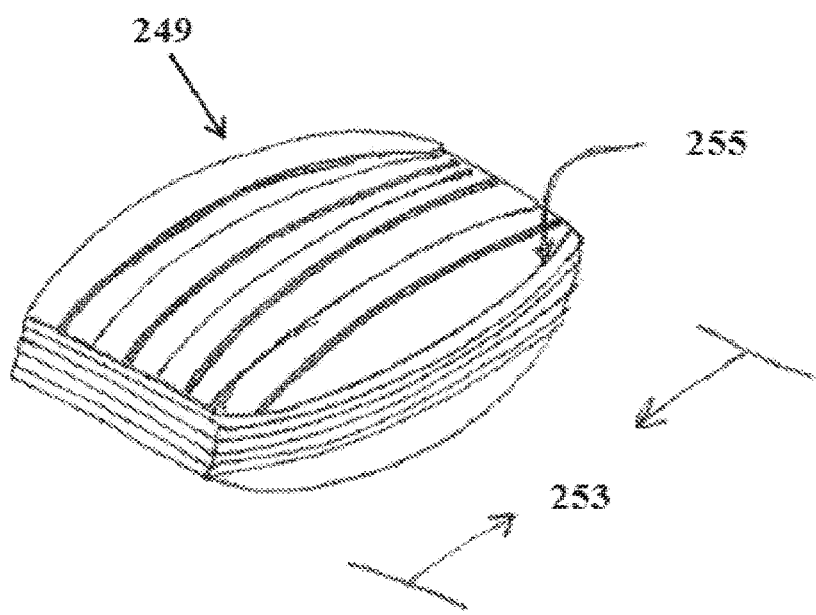
FIG. 2H

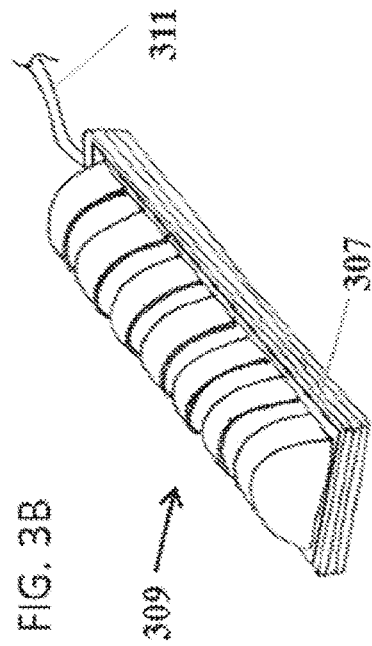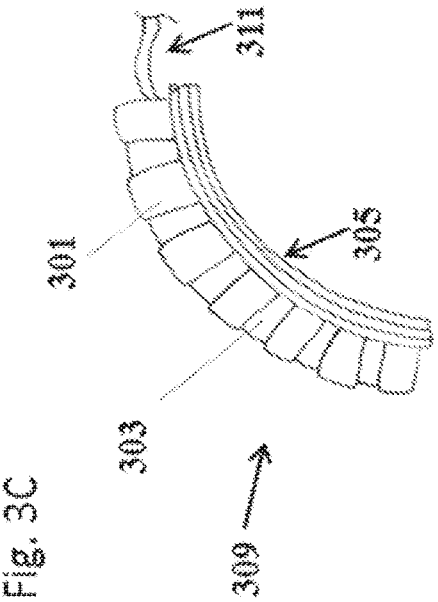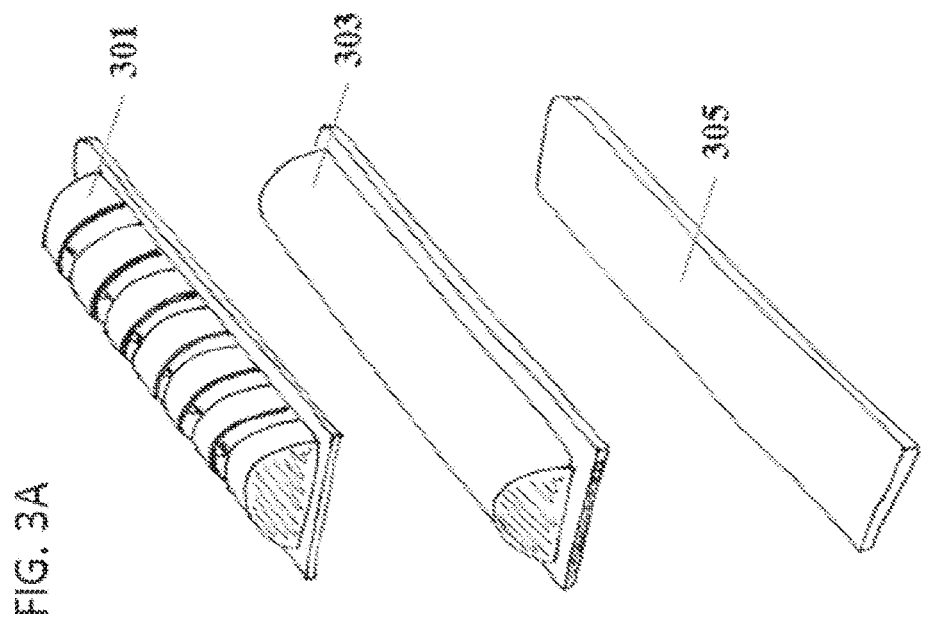

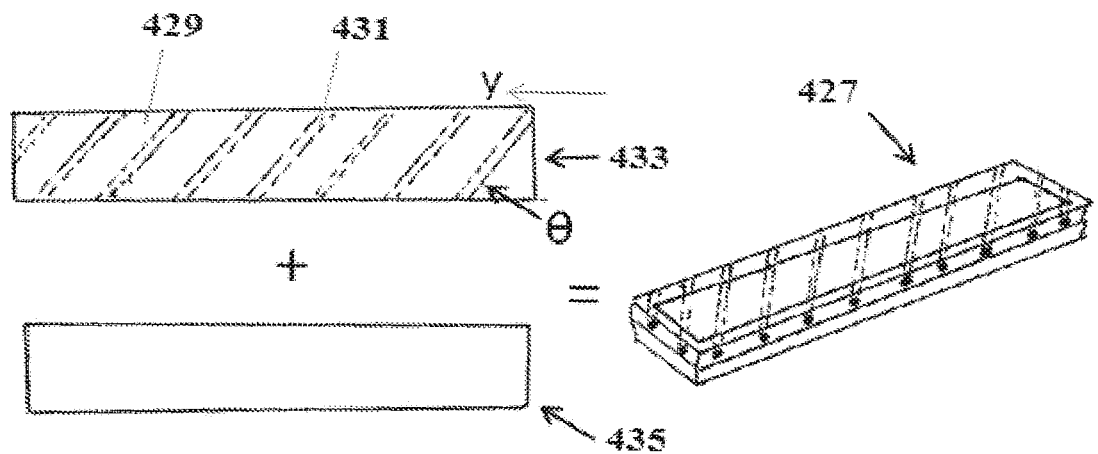
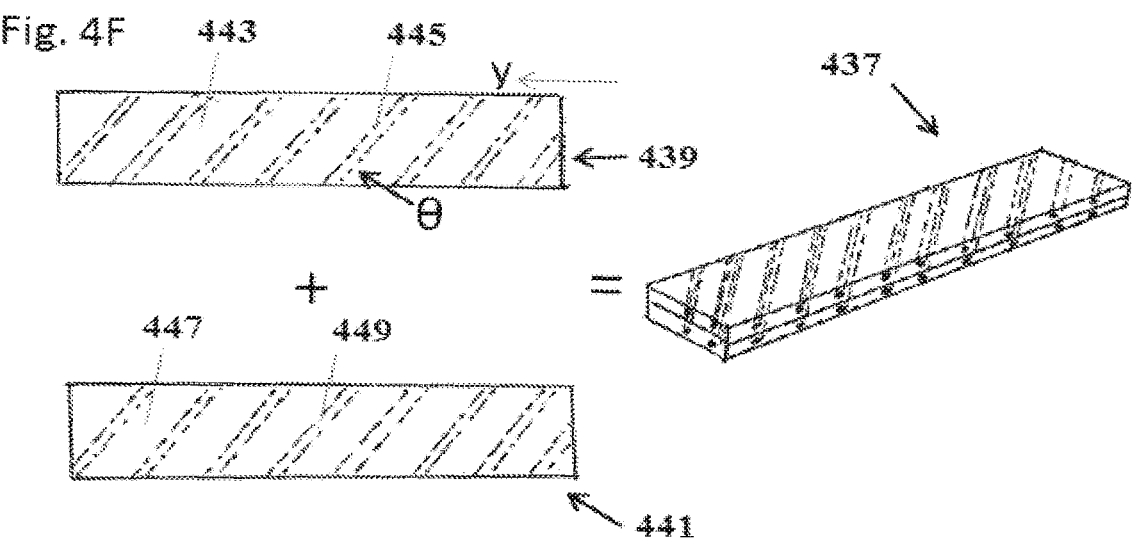

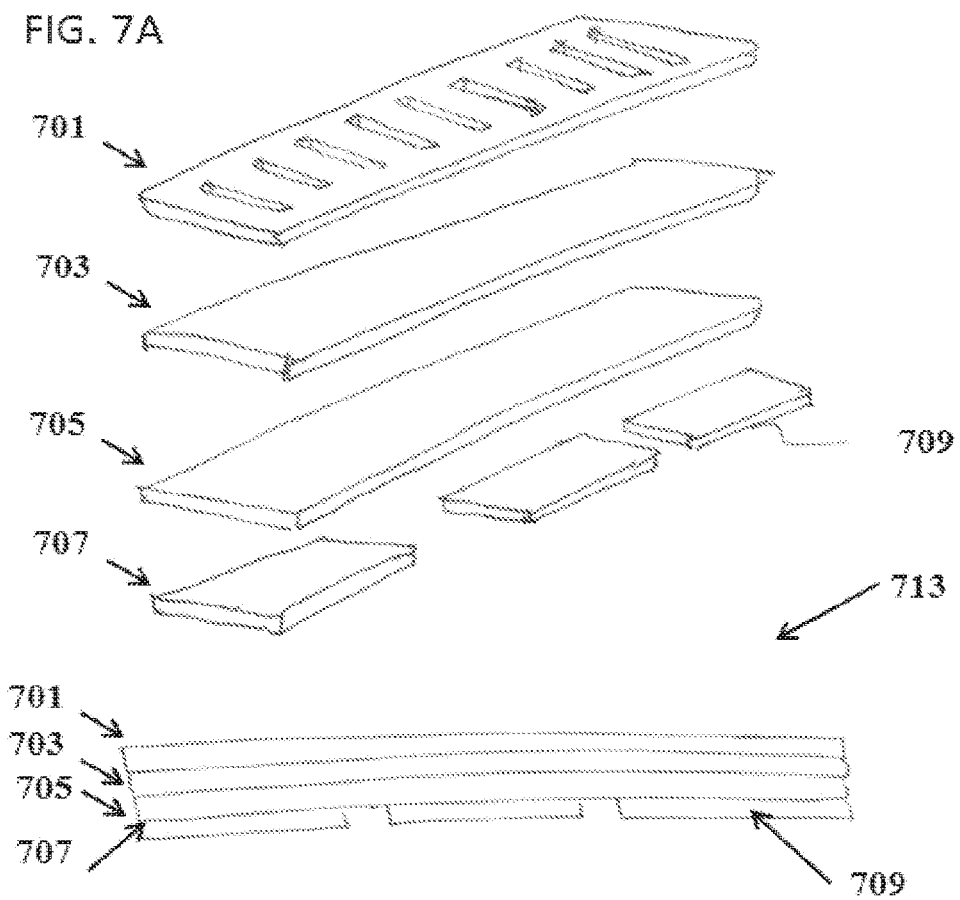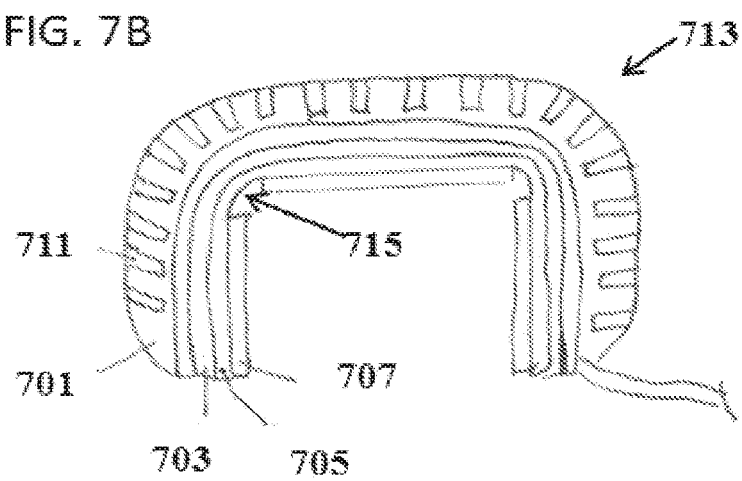

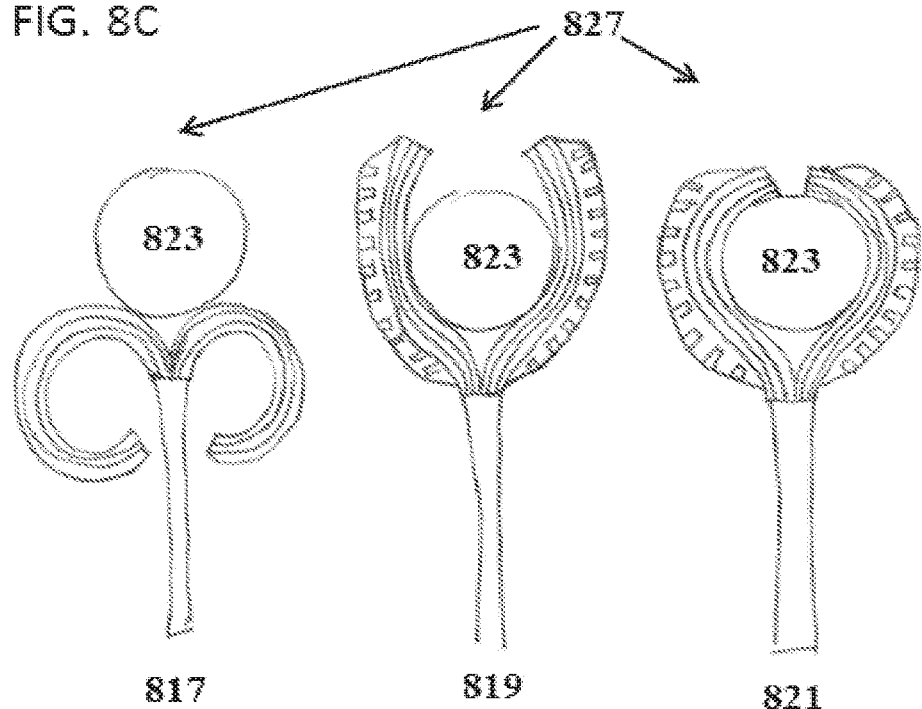
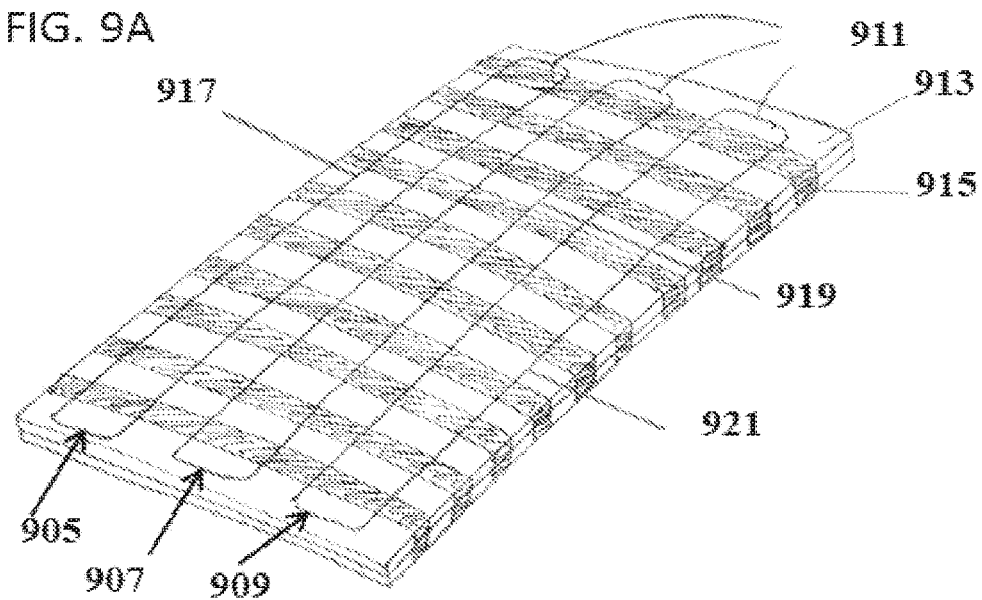

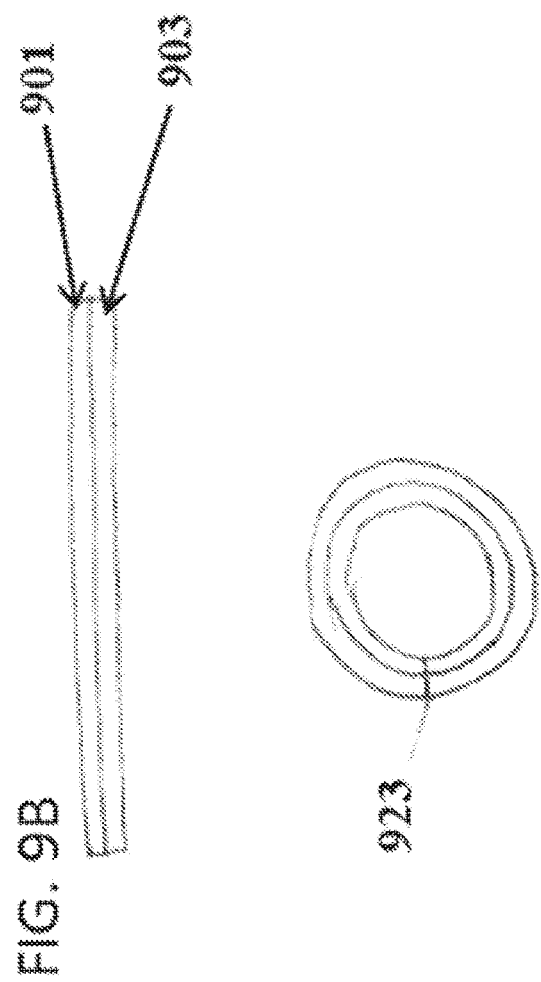

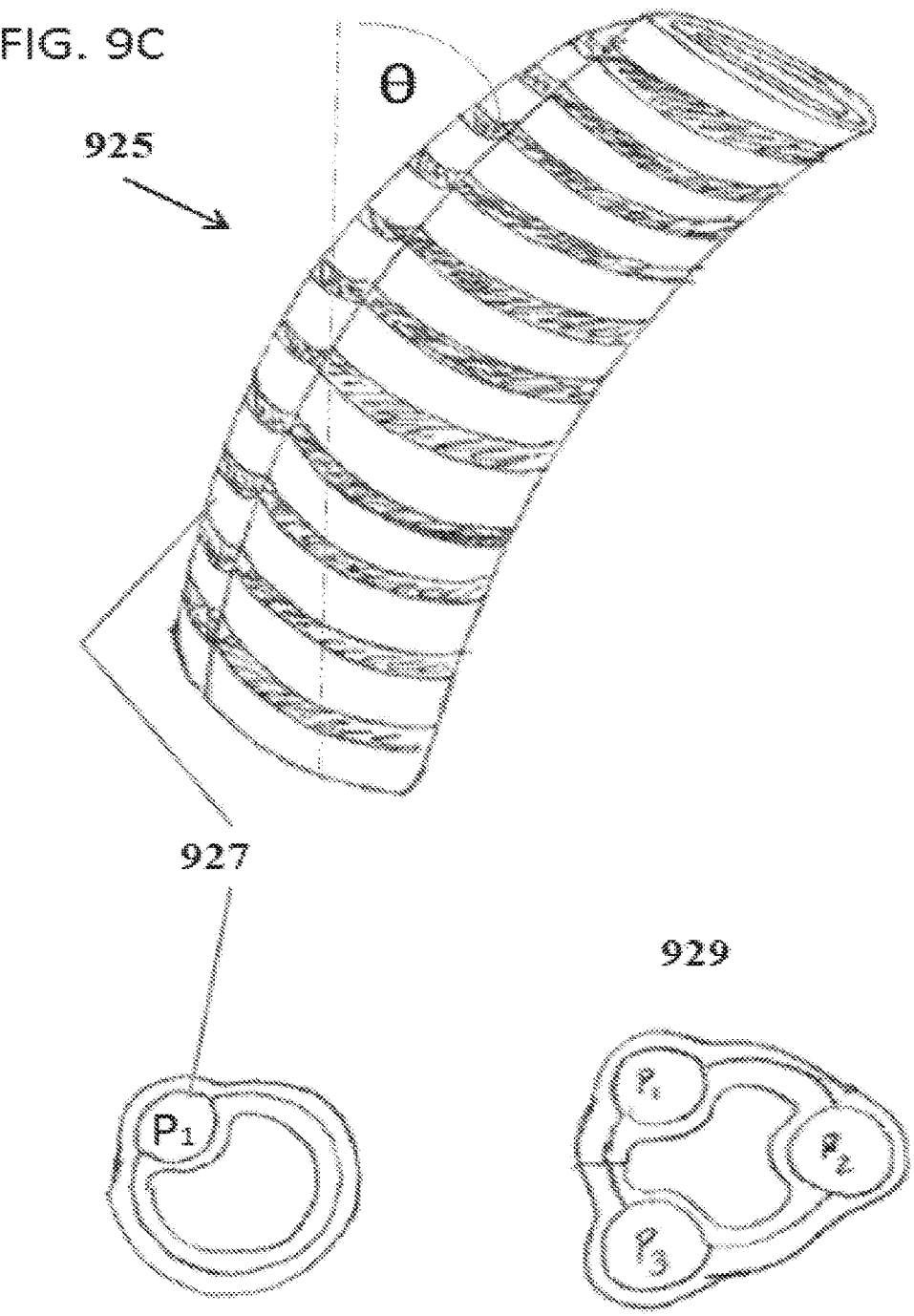

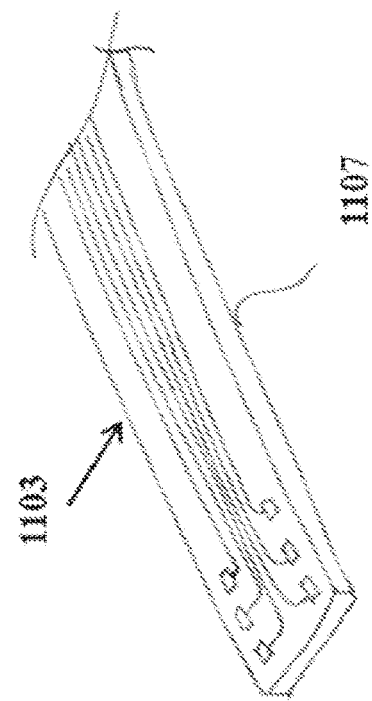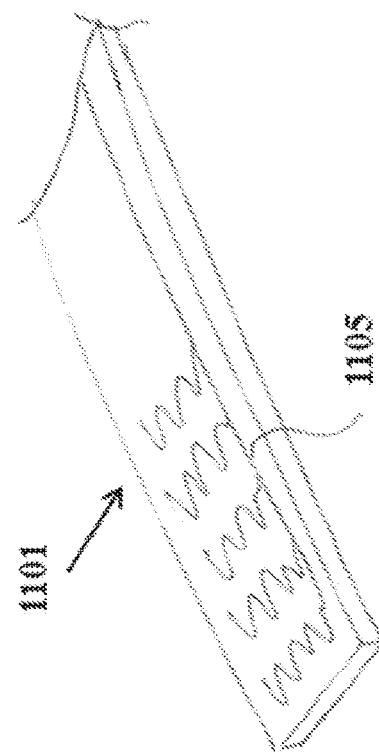
FIG. 11

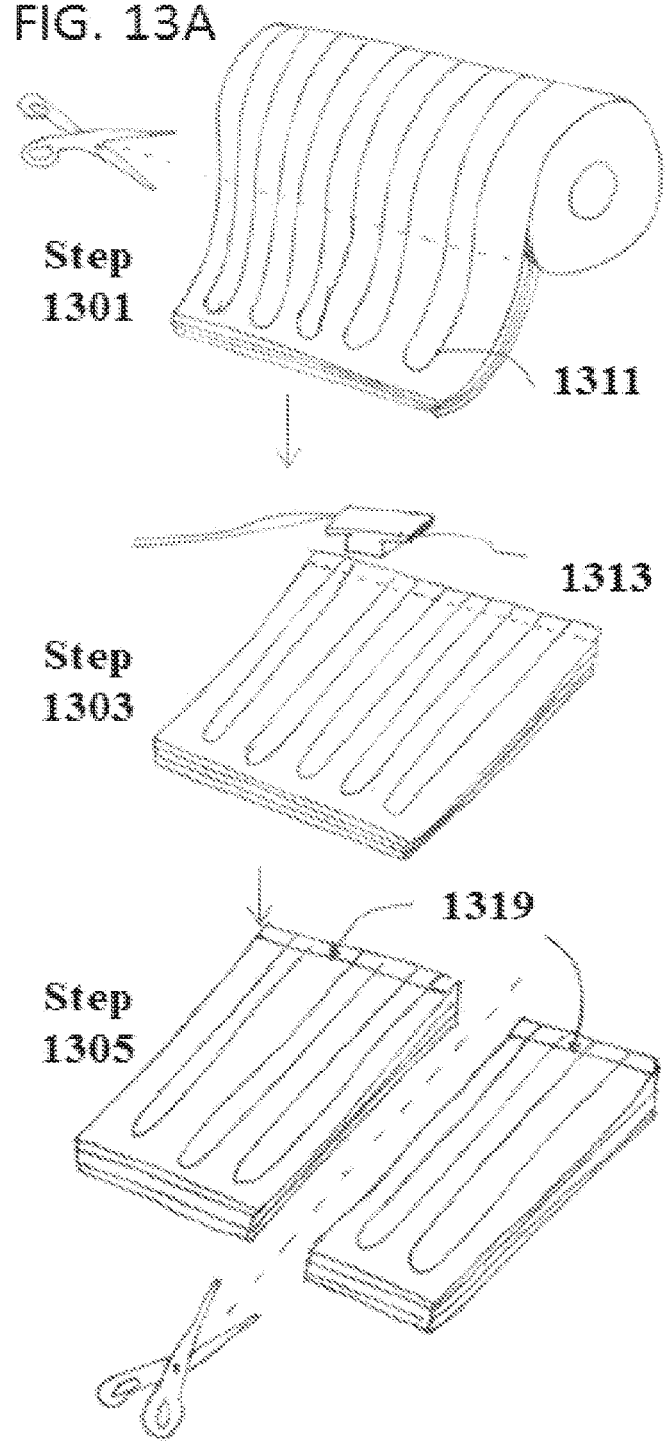

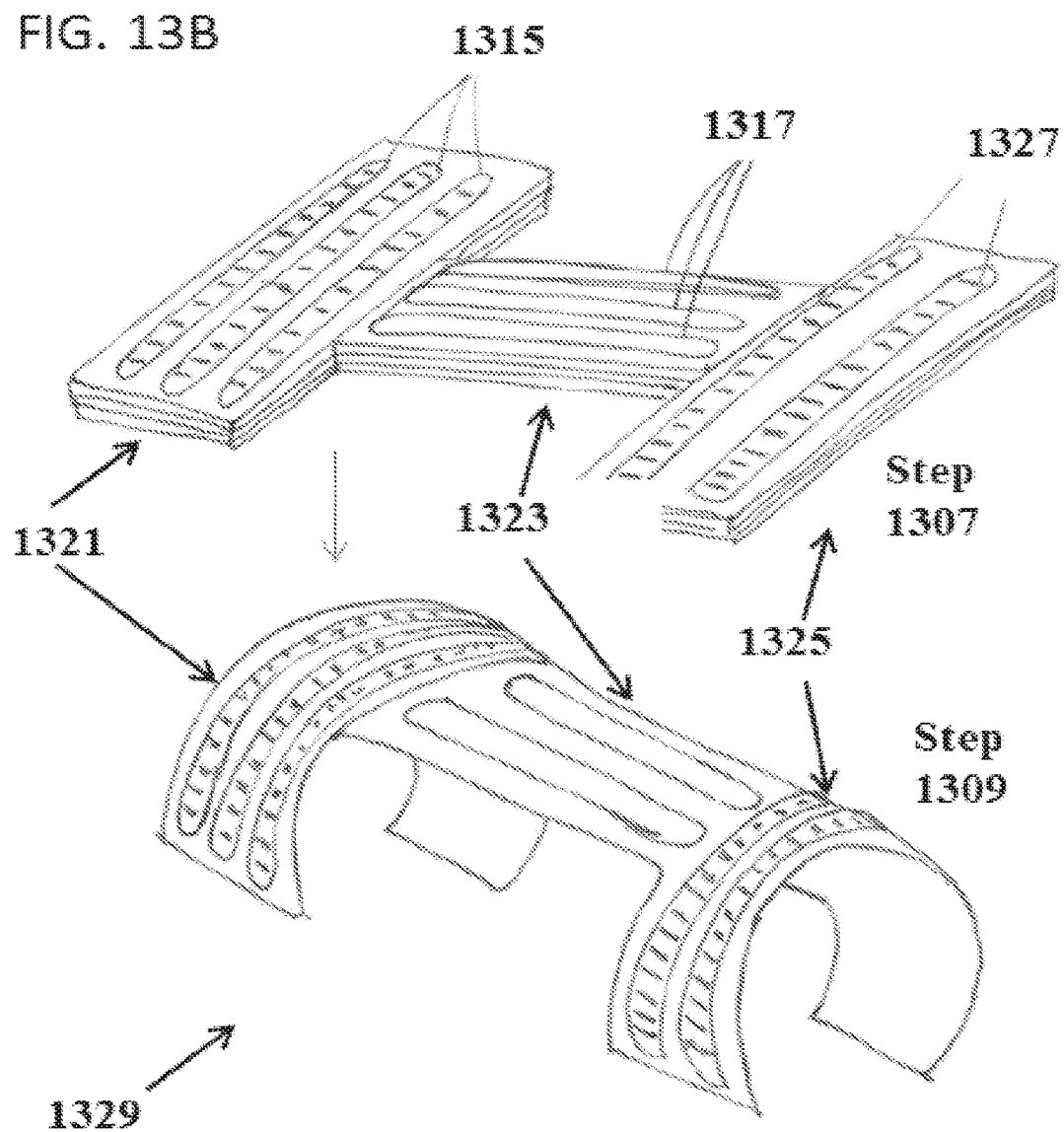

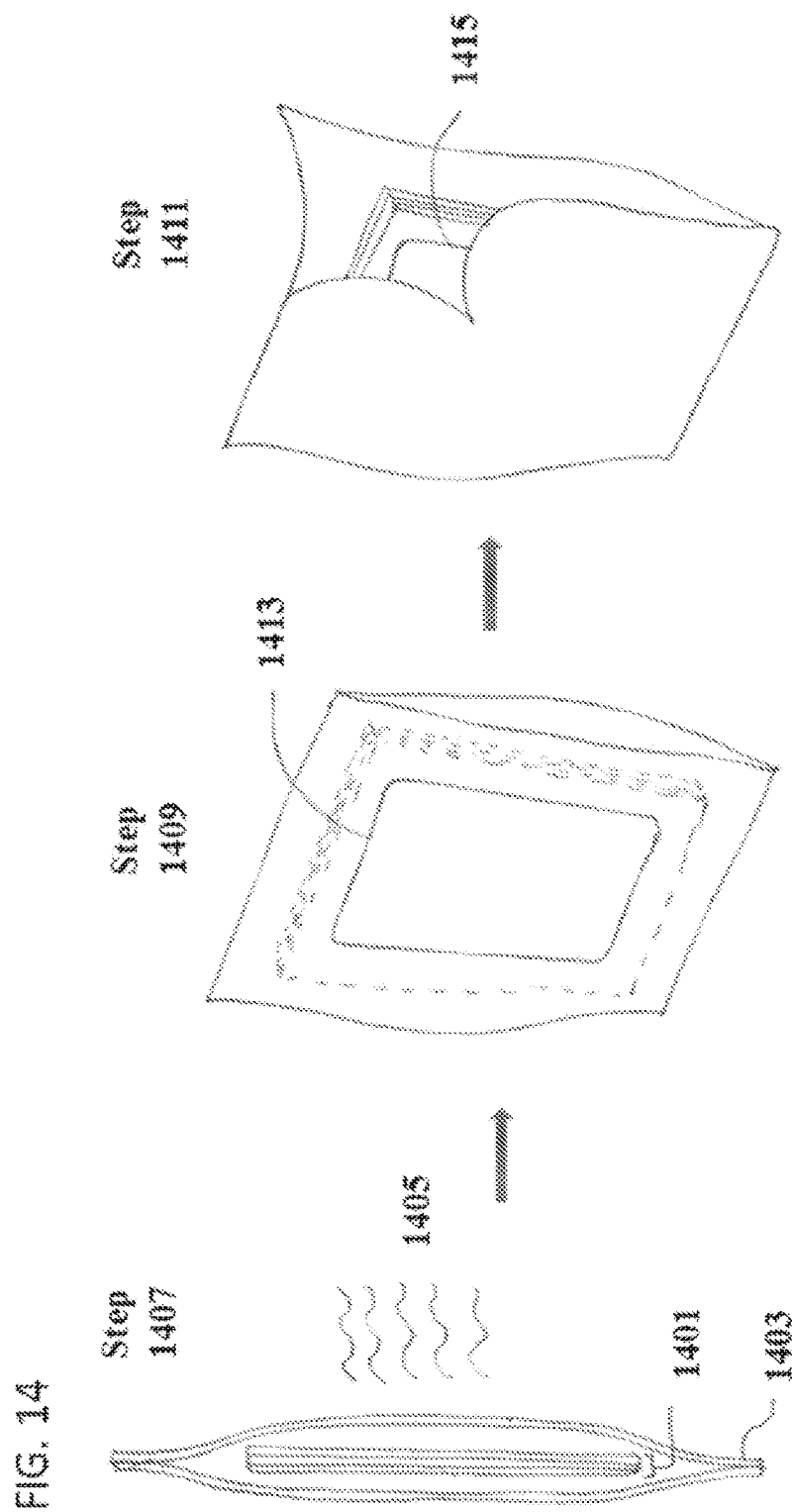

MANUFACTURING SOFT DEVICES OUT OF SHEET MATERIALS

INCORPORATION BY REFERENCE

All patents, patent applications and publications cited herein are hereby incorporated by reference in their entirety in order to more fully describe the state of the art as known to those skilled therein as of the date of the invention described herein.

RELATED APPLICATION

This Application is a continuation of U.S. patent application Ser. No. 14/502,241, filed Sep. 30, 2014, which claims priority to U.S. Provisional Application 61/885,092, filed Oct. 1, 2013, which is hereby incorporated by reference in its entirety.

BACKGROUND

Most robots are constructed using so-called "hard" body plans; that is, a rigid (usually metal) skeleton, electrical or hydraulic actuation, electromechanical control, sensing, and feedback. These robots are successful at the tasks for which they were designed (e.g., heavy manufacturing in controlled environments) but have severe limitations when faced with more demanding tasks (for example, stable motility in demanding environments): tracks and wheels perform not as efficiently as legs and hooves.

Evolution has selected a wide range of body plans for mobile organisms. Many approaches to robots that resemble animals with skeletons are being actively developed: "Big Dog" is an example. A second class of robot—those based on animals without skeletons—are much less explored, for a number of reasons: i) there is a supposition that "marine-like" organisms (squid) will not operate without the buoyant support of water; ii) the materials and components necessary to make these systems are not available; iii) the major types of actuation used in them (for example, hydrostats) are virtually unused in conventional robotics. These systems are intrinsically very different in their capabilities and potential uses than hard-bodied systems. While they will (at least early in their development) be slower than hard-bodied systems, they will also be more stable and better able to move through constrained spaces (cracks, rubble), lighter, and less expensive.

Robots, or robotic actuators, which can be described as "soft" are most easily classified by the materials used in their manufacture and their methods of actuation. Pneumatic soft robotic actuators can be manufactured using inextensible materials, which rely on architectures such as follows. McKibben actuators, also known as pneumatic artificial muscles (PMAs), rely on the inflation of a bladder constrained within a woven sheath which is inextensible in the axis of actuation. The resultant deformation leads to radial expansion and axial contraction; the force that can be applied is proportional to the applied pressure. Related actuators are called pleated pneumatic artificial muscles.

There are "soft" robotic actuators such as shape memory alloys which have been used both as the actuation method and as the main structural component in robots which can both crawl and jump. Another approach, which can be described as "soft" uses a combination of traditional robotic elements (an electric motor) and soft polymeric linkages based on Shape Deposition Manufacturing (SDM). This technique is a combination of 3D printing and milling. An example of a composite of traditional robotics with soft elements has been used with success in developing robotic grippers comprising soft fingers to improve the speed and efficiency of soft fruit packing in New Zealand.

Soft robotics using interconnected channels in a molded elastomeric have been reported. Soft robotics can be actuated using pneumatic pressure to cause the robot to undergo a range of motions. The basic soft robotic actuator includes an extensible channel or bladder that expands against a stiffer or less extensible backing. See, PCT Appln. Ser. No. PCT/US11/61720 for additional information on the design and actuation of soft robotics, the contents of which are incorporated in its entirety by reference.

Molding is one way to make soft robotic actuators; however, it is a batch process. There thus remains a need for low cost, simple, and high throughput methods for making soft robotics. There also remains a need for new, simple, and efficient designs for soft robotic actuation devices.

SUMMARY

Described herein are soft composite actuators which can be produced easily and efficiently. The soft composite actuator as disclosed herein can be manufactured by bonding two or more material layers or sheets together. The material layers may be bonded together to form one or more bladder configured to hold pressurized fluid. The soft composite actuator may be actuated when the bladder therein is pressurized by infusing fluids into the bladder. The bonding may be achieved by mechanical, thermal, and/or chemical means or combination thereof. The soft composite actuator as disclosed herein can be manufactured without using any mold.

In some embodiments, one of the material layers is made of a thermoplastic elastomer material which can be thermally bonded (or high frequency welded or ultrasonically welded) together with other layers to define the actuator's bladder (e.g., air tight bladders). These constructions could also be achieved with chemical and mechanical bonds or a combination thereof. Methods of making and using the soft composite actuator are also disclosed herein.

In one aspect, a soft composite actuator is described, including:
a strain limiting layer;
a first radially constraining layer; and
a first elastomeric layer disposed between the first radially constraining layer and the strain limiting layer;
wherein
the first elastomeric layer, the strain limiting layer, and the first radially constraining layer are bonded together to form at least one bladder for holding pressurized fluid.

In any embodiment described herein, the bond is selected from the group of thermal bonds, chemical bonds, mechanical bonds and combinations thereof.

In any embodiment described herein, the soft composite actuator further includes a second elastomeric layer disposed adjacent to the first elastomeric layer and the strain limiting layer comprises a second radially constraining layer.

In any embodiment described herein, the radially constraining layer includes one or more radially constraining sections.

In any embodiment described herein, the radially constraining sections includes radially constraining strips evenly or unevenly distributed in the radially constraining layer.

In any embodiment described herein, the radially constraining strips are oriented parallel to one of the edges of the radially constraining layer or at an angle to one of the edges of the radially constraining layer.

In any embodiment described herein, the radially constraining strips are bonded to the first elastomeric layer.

In any embodiment described herein, the radially constraining layer includes one or more strain limiting sections free from any openings.

In any embodiment described herein, the radially constraining layer includes:

one or more openings through which one or more portions of the adjacent first elastomeric layer expand upon actuation, and one or more strain limiting sections free from any openings.

In any embodiment described herein, the first elastomeric layer, the strain limiting layer, and the first radially constraining layer are bonded together to form a plurality of bladders for holding pressurized fluid.

In any embodiment described herein, the soft composite actuator further includes one or more rigid elements attached to the strain limiting layer.

In any embodiment described herein, the bladder is designed to accommodate a pressurized fluid selected from the group consisting of a gas and a liquid.

In any embodiment described herein, one of the elastomeric layer, the strain limiting layer, and the radially constraining layer is configured to absorb fluids, transmit light, change color or luminescence, embed a soft sensor or a medical patch, embed at least a part of an electronic circuit or a heating element, and a combination thereof.

In any embodiment described herein, the soft composite actuator is part of a splint, a grasper, or a glove comprising a plurality of digits, or is a splint, a grasper, or a glove.

In another aspect, a soft composite actuator is described, including:

a monolithic, first composite layer including one or more first elastomeric sections and one or more first radially constraining sections; and a strain limiting layer, wherein the first composite layer and the strain limiting layer are bonded together to form at least one bladder for holding pressurized fluid.

In any embodiment described herein, the strain limiting layer includes a monolithic, second composite layer including one or more second elastomeric sections and one or more second radially constraining sections.

In any embodiment described herein, the first and/or second elastomeric section, the first and/or second radially constraining section, and the first and/or second composite layer have the same thickness.

In any embodiment described herein, the first and/or second elastomeric section and the first and/or second radially constraining section have different thickness.

In any embodiment described herein, the first and/or second radially constraining section is encapsulated in the first and/or second elastomeric section.

In any embodiment described herein, the first and/or second elastomeric sections and the first and/or second radially constraining sections are bonded together.

In any embodiment described herein, the bond is selected from the group of thermal bonds, chemical bonds, mechanical bonds and combinations thereof.

In any embodiment described herein, the radially constraining sections comprise radially constraining strips oriented parallel to one of the edges of the composite layer or at an angle to one of the edges of the composite layer.

In any embodiment described herein, the radially constraining strips are evenly or unevenly distributed in the composite layer.

In any embodiment described herein, the first composite layer and the strain limiting layer are bonded together to form a plurality of bladders for holding pressurized fluid.

In any embodiment described herein, the soft composite actuator further includes one or more rigid elements attached to the strain limiting layer.

In any embodiment described herein, the bladder is designed to accommodate a pressurized fluid selected from the group consisting of a gas and a liquid.

In any embodiment described herein, one of the layers is configured to absorb fluids, transmit light, change color or luminescence, embed a soft sensor or a medical patch, embed at least a part of an electronic circuit or a heating element, and a combination thereof.

In any embodiment described herein, the soft composite actuator is part of a splint, a grasper, or a glove comprising a plurality of digits, or is a splint, a grasper, or a glove.

In yet another aspect, a soft actuating device including a plurality of the soft composite actuators of any one of embodiments is described.

In any embodiment described herein, the soft actuating device includes:

a first soft composite actuator connected to a first fluid source; and a second soft composite actuator connected to a second fluid source.

In yet another aspect, a method of actuation is described, including:

providing a soft composite actuator of any one of embodiments; and pressurizing the bladder with a fluid, wherein the soft composite actuator actuates in a predetermined manner.

In any embodiment described herein, actuation of the soft composite actuator achieves one or more motions selected from the group consisting of bending motion, combination bending, twisting motion, linear extension, a combination of linear extension and twist, linear contraction, a combination of linear contraction and twist, and any combination thereof.

In any embodiment described herein, the soft composite actuator is configured to open an incision or move, displace organs, muscle, and/or bone, brace a joint, be worn to support joint movements, shape-match an object, fold predefined bending joints to create origami-like structures, achieve a sufficient grasp over the object, or create a padded layer conformal to the object.

In any embodiment described herein, the pressurized fluid is temperature-regulated.

In any embodiment described herein, the soft composite actuator stiffens upon fluid pressurization.

In any embodiment described herein, the bladder is configured to be inflated to a first degree of stiffness under a first fluid pressure or to a second degree of stiffness under a second fluid pressure different from the first fluid pressure.

In any embodiment described herein, the actuator is actuated to distribute forces, mixing material, handling material, lifting, grasping, steering a photovoltaic cell or a mirror, steering material on a surface.

In yet another aspect, a method of actuation is described, including:

providing the soft actuating device of any one of the embodiments described herein; and pressurizing one or more bladders with one or more fluids, wherein the soft actuating device actuates in a predetermined manner.

In yet another aspect, a method of actuation is described, including:

providing the soft actuating device of any one of the embodiments described herein; and pressurizing the first soft composite actuator's bladder and the second soft composite actuator's bladder alternately by activating the first fluid source and the second fluid source alternately.

the first soft composite actuator bends upon actuation and the second soft composite actuator stiffens upon actuation.

In yet another aspect, a method of making a soft composite actuator of any one of the embodiments described herein is disclosed, including:

providing a first elastomeric layer, a strain limiting layer, and a first radially constraining layer; wherein the elastomeric layer is disposed between the radially constraining layer and the strain limiting layer; and bonding the first elastomeric layer, the strain limiting layer, and the first radially constraining layer to form sealed parameters defining at least one bladder for holding pressurized fluid.

In any embodiment described herein, providing a first elastomeric layer, a strain limiting layer, and a first radially constraining layer includes:

providing a pre-stacked laminate comprising a first elastomeric laminate layer, a strain limiting laminate layer, and a first radially constraining laminate layer; and separating part of the laminate to provide the first elastomeric layer, the strain limiting layer, and the first radially constraining layer stacked together.

In yet another aspect, a method of making a soft composite actuator of any one of the embodiments described herein is disclosed, including:

providing the first composite layer and the strain limiting layer; and bonding the first composite layer and the strain limiting layer to form sealed parameters defining at least one bladder for holding pressurized fluid.

In any embodiment described herein, providing the first composite layer and the strain limiting layer including:

providing a pre-stacked laminate comprising a first composite laminate layer and a strain limiting laminate layer; and separating part of the laminate to provide the first composite layer and the strain limiting layer stacked together.

In any embodiment described herein, the bond is selected from the group of thermal bonds, chemical bonds, mechanical bonds and combinations thereof.

In any embodiment described herein, the elastomeric layer, the strain limiting layer, and the radially constraining layer are contained in a package.

In any embodiment described herein, bonding is achieved by external heat passing through the packaging or internal heat generated by a heating element inside the packaging without the compromise of the package.

In any embodiment described herein, the elastomeric layer or the first composite layer is in a pre-strained state before bonding.

In any embodiment described herein, one of the layers has a non-planar shape before or during bonding.

The combination of any one embodiment described herein with any other one or more embodiments described herein is contemplated.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps. The term "laminate" and "soft composite actuator" may be used interchangeably.

DESCRIPTION OF THE DRAWINGS

The invention is described with reference to the following figures, which are presented for the purpose of illustration only and are not intended to be limiting. In the Drawings:

FIG. 1A presents an exploded and assembled view of an actuatable device capable of bending that includes two layers bonded together such that the bond defines an airtight (or water tight) bladder: one layer having strain limiting properties and the other layer having elastic properties, according to one or more embodiments described herein.

FIG. 2A is an exploded and assembled view of an actuatable device capable of bending that includes three layers bonded together such that the bond defines an airtight (or water tight) bladder, including: one layer having radial strain limited properties, one layer having elastic properties, and another layer having strain limiting properties, according to one or more embodiments described herein.

FIG. 2B is a side view of the three-layer bending actuator according to one or more embodiments described herein under fluid pressurization where the radially constraining layer limits radial expansion of the elastic layer and promotes linear growth by allowing the elastic layer to expand via the cut outs of the radially constraining layer.

FIGS. 2C-G describe a process where two radially constraining layers and two elastic layers can be bonded to form a linear extending actuator, according to one or more embodiments described herein.

FIG. 2C presents an exploded view of the layer assembly, according to one or more embodiments described herein.

FIG. 2D depicts half of the assembly where after bonding, the excess material from the radially constraining layer can be removed leaving strain limiting strips bonded to the elastic layer, according to one or more embodiments described herein.

FIG. 2E is a cross-section view of the laminate without and with fluid pressurization, according to one or more embodiments described herein.

FIG. 2F is a perspective view of the linear extending actuator in an unpressurized state, according to one or more embodiments described herein.

FIG. 2G is a perspective view of the linear actuator according to one or more embodiments described herein extending under fluid pressurization where the strain limiting strips, connected by the bond, form radially constraining hoops along the length of the actuator, thus promoting linear extension.

FIG. 2H demonstrates that changing the orientation of the strain limiting strips to the longest dimension of the actuator can be used as an approach to make a contracting linear actuator (i.e., the largest deformation is contractile), according to one or more embodiments described herein.

FIG. 3A presents an exploded view of a bending actuatable device including layers preformed to a particular shape before or during assembly so that the actuator takes on a non-planar profile in its unpressurized state, according to one or more embodiments described herein.

FIG. 3B presents a perspective view of the assembled bending actuator in its unpressurized state, according to one or more embodiments described herein.

FIG. 3C presents a side view of the bending actuator in a pressurized state, according to one or more embodiments described herein.

FIG. 4E is an exploded and assembled view of an actuatable device capable of bending and twisting under fluid pressurization, according to one or more embodiments described herein.

FIG. 4F is an exploded and assembled view of an actuatable device capable of linear extension and twisting under fluid pressurization by bonding two anisotropic layers with angled elastic and strain limiting elements, according to one or more embodiments described herein.

FIG. 7A depicts an exploded view and cross-section view of an actuatable device that incorporates rigid elements as an additional layer that can be used to define bending points, adjust the bending radius of curvature, improve force transmission, and act as a mounting substrate for auxiliary equipment, according to one or more embodiments described herein.

FIG. 7B is a side view of a bending actuator under fluid pressurization with rigid elements where it only bends at the gaps between the rigid elements, according to one or more embodiments described herein.

FIG. 8C illustrates that opposing bimorph bending actuators can be used to form a grasper, according to one or more embodiments described herein.

FIG. 9A is an extension of FIG. 4C where multiple linear extending actuators can be grouped on the same laminate to form a multi-degree of freedom bending and extending actuator, according to one or more embodiments described herein.

FIG. 9B is an end view of FIG. 9A and depicts the next stage in the fabrication of a multi-degree of freedom bending and extending actuator where the laminate is bonded end to end to form a tube shape, according to one or more embodiments described herein.

FIG. 9C illustrates that when one bladder is pressurized it will linearly extend causing the tube structure to bend, according to one or more embodiments described herein.

FIG. 11 is perspective view of a material layer demonstrating multi-functionality and optionally incorporating electronics, heating elements, sensors, and so forth, according to one or more embodiments described herein.

FIG. 13A shows a sequence of images where a rolled sheet of actuatable devices can be cut to a desired length and the bladders can be resealed with a sealing tool, according to one or more embodiments described herein.

FIG. 13B illustrates how these sheets of actuatable devices can be sealed and bonded together to form a range of different actuatable structures, according to one or more embodiments described herein.

FIG. 14 depicts a process by which the bladders of actuatable devices can be defined while the layers of the laminate are contained within packaging (both sterile and non-sterile), according to one or more embodiments described herein.

DETAILED DESCRIPTION

Figure 1B:
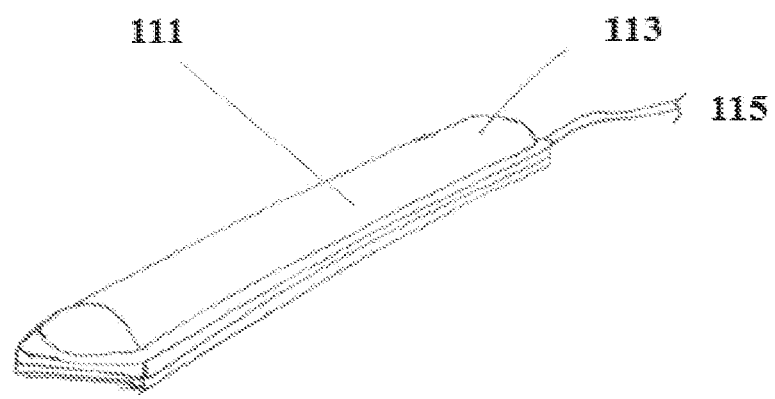
FIG. 1B presents a perspective view of the two-layer bending actuator under fluid pressurization where the elastic layer swells and grows in radius and in length, according to one or more embodiments described herein.

Described herein are soft composite actuators made by bonding two or more material layers. A material layer, as used herein, may refer to an elastomeric layer, a strain limiting layer, a radially constraining layer, or a first or second composite layer including one or more elastomeric sections and one or more radially constraining sections. The elastomeric layer, as used herein, refers to a layer which is made of one or more elastic materials and can be bent, curved, twisted, or subjected to any other motion to change its shape and/or orientation under pressure. Non-limiting examples of the elastic material include elastic polymer (e.g. urethanes and silicones), thermoplastic elastomers (TPEs), thermoplastic urethanes (TPUs) and so forth. As used herein, "elastomeric" and "elastic" are used interchangeably.

In some embodiments, the material layer is a strain limiting layer. The strain limiting layer, as used herein, refers to any layer which is not elastic or less elastic than the elastomeric layer. As a result, under actuation (e.g., pressurization of the bladder), the changes in the shape or orientation of the elastomeric layer, not that of the strain limiting layer, will predominantly determine the shape, curvature, and/or orientation of the soft composite actuator after actuation. In some embodiments, the strain limiting layer is made of one or more strain limiting materials. Non-limiting examples of the strain limiting material include fibers, thread, non-woven materials, and higher duromoter materials to name a few. Any other materials known in the art suitable as the strain limiting material can be used.

In other embodiments, the material layer is a radially constraining layer which limits the radial expansion of the resulting bladder and promotes efficient bending. In some specific embodiments, the radially constraining layer can have strain limiting properties such as those of the strain limiting layer. The radially constraining layer employs the strain limiting material to restrict the radial expansion of the bladder in the soft composite actuator. In one or more embodiments, the radially constraining layer is a sheet of high durometer material that contains openings, e.g., cutouts, which provide radially constraining regions (e.g., strips or bands) of spaced at locations to allow portions of the adjacent elastomeric layer to expand through the cutouts. The radially constraining regions are positioned and arranged (e.g., as bands or stripes traversing the width of the soft composite actuators) so that the elastomeric layer's radial expansion will be limited or restricted. In some embodiments, the radially constraining regions are evenly or unevenly distributed in the radially constraining layer. In some specific embodiments, the radially constraining regions, e.g., strips 220 in FIG. 2C, are oriented parallel to one of the edges of the radially constraining layer or at an angle to one of the edges of the radially constraining layer. The angle ($\theta$) can be in any ranges or have any values. In some embodiments, $\theta$ is about 10, 20, 30, 40, 45, 50, 60, 70, 80 degree, or in any ranges bound by any two of the values disclosed herein.

In some specific embodiments, the radially constraining layer or section restrict the radial swelling of the bladder or elastomeric layer to promote more efficient bending of the actuator by supporting linear extension of the elastic layer and limiting radial expansion, which does not promote bending. In still other embodiments, the radially constraining region can be incorporated into a layer containing other materials. By way of example, the radially constraining layer or strain limiting layer can be a monolithic composite layer, e.g., layer 401 in FIG. 4A, comprising one or more elastomeric sections and one or more radially constraining sections. The elastomeric section may be made of elastomeric materials and the radially constraining section may be made of strain limiting materials.

In certain embodiments, the radially constraining layer comprises one or more individual radially constraining sections, which can be assembled and bonded to form a radially constraining layer. In certain specific embodiments, the radially constraining sections comprise radially constraining strips evenly or unevenly distributed in the radially constraining layer. The radially constraining strips, e.g., strips 405 in FIG. 4A, may be oriented parallel to one of the edges of the radially constraining layer or at an angle to one of the edges of the radially constraining layer. The angle ($\theta$) can be in any ranges or have any values. In some embodiments, $\theta$ is about 10, 20, 30, 40, 45, 50, 60, 70, 80 degree, or in any ranges bound by any two of the values disclosed herein. The radially constraining strips may be bonded to the first elastomeric layer.

In some embodiments, the material layer is a radially constraining layer described above.

The two or more material layers are bonded together to form sealed at least one bladder for holding pressurized fluid. In some embodiments, the perimeters or certain portions of two adjacent material layers in the soft composite actuator are bonded together to result in a fluid-tight bladder, except that the bladder may be connected to a fluid infusion/ vacuum source. In certain embodiments, the perimeters or certain portions of the adjacent elastomeric layer and the strain limiting layer in the soft composite actuator are bonded together to result in a fluid-tight bladder. In other embodiments, the perimeters or certain portions of the adjacent first composite layer and the strain limiting layer in the soft composite actuator are bonded together to result in a fluid-tight bladder. In still other embodiments, the perimeters or certain portions of the adjacent first composite layer and the second composite layer in the soft composite actuator are bonded together to result in a fluid-tight bladder. In still other embodiments, the soft composite actuator comprises two elastomeric layers and the perimeters or certain portions of the two adjacent elastomeric layers are bonded together to result in a fluid-tight bladder.

In other embodiments, the radially constraining layer comprises one or more strain limiting sections free from any openings. Thus, the radially constraining layer may include one or more openings through which one or more portions of the adjacent first elastomeric layer expand upon actuation, and one or more strain limiting sections free from any openings. Upon actuation, such soft composite actuator may bend at the portion of the radially constraining layer having the openings and may stiffen at the portion of the radially constraining layer free from any openings.

In some embodiments, the bladder is airtight except its connection to an external fluid source to infuse pressurized fluid into the bladder. Non-limiting examples of the fluids include a gas and a liquid. Non-limiting examples of the fluid source include a gas tank, a gas cylinder, a liquid pump, compressor, gases given off by a chemical reaction, and so forth. The gas may be air, nitrogen, or one of the inert gases. The liquid may include water, aqueous solution, and organic solvents or solutions. Upon actuation (e.g., when the bladder is infused with pressurized fluid), the soft composite actuator may actuate in a pre-determined way to change the actuator's shape, size, orientation, and/or curvature, to achieve one or more desirable functions. The soft actuator may have one bladder or a plurality of bladders connected to the same or different fluid sources.

In one aspect, a soft composite actuator is described, including comprising:
an elastomeric layer;
a strain limiting layer; and
a radially constraining layer,
wherein
the elastomeric layer is disposed between the radially constraining layer and the strain limiting layer; and
the elastomeric layer, the strain limiting layer, and the radially constraining layer are bonded together to form at least one bladder for holding pressurized fluid.

The strain limiting layer may be located at the top or bottom of the soft composite actuator. The layered soft composite actuator allows for the control of the direction of expansion. For instance, FIGS. 1-3 show that the soft composite actuator can be constructed by layering materials of different elasticity and subtracting material (e.g., elastomeric layer, strain limiting layer, and radially constraining layer).

Figure 1C:
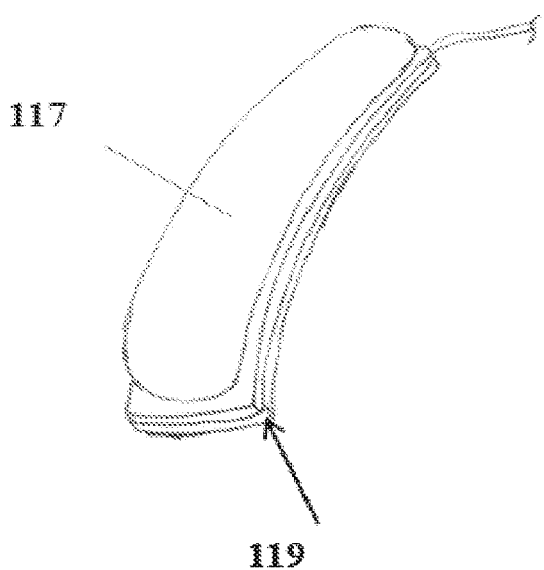
FIG. 1C is a perspective view of the two-layer bending actuator under fluid pressurization where at a certain pressure the swelling elastic layer will cause the strain limited layer to bend, according to one or more embodiments described herein.

The actuation mechanism of the soft composite actuator is first described with reference to FIGS. 1A-1C. As shown in FIG. 1A, an elastic layer 101 and a strain limiting layer 103 are bonded at the layers' perimeter 105. The bonding may be achieved thermally, mechanically, and/or chemically. In some embodiments, the elastic layer is made of elastic polymers which can be thermally bonded to other layers such as the strain limiting layer. The term "elastic layer" or "elastic section" (described below), as used herein, refers to any material layer or section made of material having elastic properties and can bend or expand under pressure. The term "strain limiting layer", as used herein, refers to any material layer which is not elastic or less elastic than the elastic material forming the elastic layer or the elastic section in the composite layer described below. The bonding of the elastic layer 101 and the strain limiting layer 103 results in the formation of an airtight bladder 107, which is sealed off except its connections to an outside fluid infusion/vacuum source configured to inflate or deflate the bladder by infusing and removing the fluid in and out of the bladder.

Thus, when two different material layers (i.e., one elastic layer 101 and one strain limiting layer 103) are bonded to form a bladder, the resulting structure 109 has an anisotropic response to pressurized fluid in the bladder. The elastic layer 101 expands while the strain limiting layer 103 undergoes limited expansion. The difference in strain responses between the two layers may cause the structure to bend in the direction of the strain limited layer (FIG. 1C). FIG. 1B illustrates the soft composite actuator with a bladder 111 partially filled by pressured fluid from the fluid infusion/vacuum source 115. The partially filled bladder has an inside pressure higher than the outside pressure ($\Delta p$) so that the elastic layer 113 is curved. When the bladder is fully filled by the pressured fluid, the linear growth of the portion of the elastic layer forming the inflated air tight bladder (portion 117 in FIG. 1C) will eventually cause the strain limited layer 119 to bend. The circumferential constraint, i.e., the bonding at the perimeter 105, is beneficial because without such circumferential constraints, the material layer has considerable radial growth which after a certain point (e.g., when the material approaches its yield stress or fatigue yield stress), is not useful for the purposes of the bending.

Figure 2G:
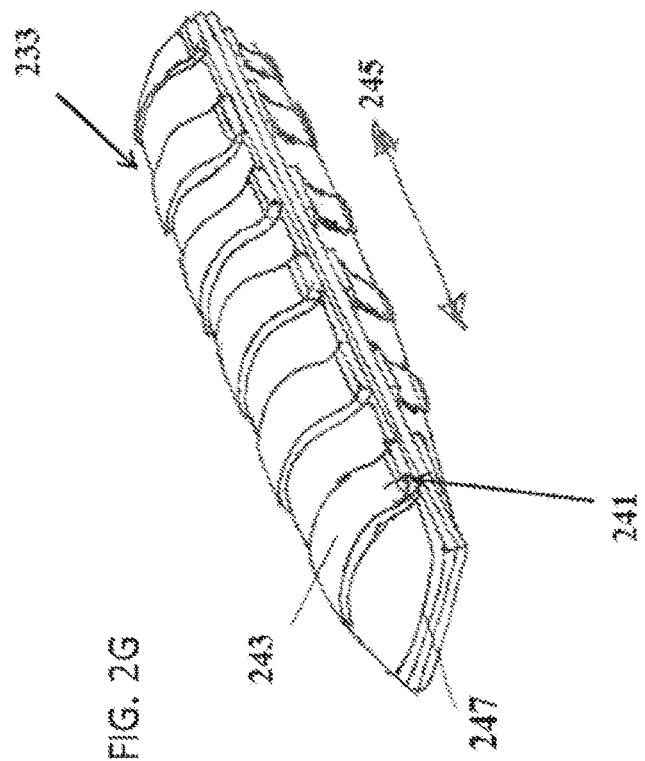

A soft composite actuator according to one or more embodiments is described with reference to FIGS. 2A-2H. As shown in FIG. 2A, an elastomeric layer 203 is disposed between a radial constraining layer 201 and a strain limiting layer 205. The perimeters of layers 201, 203, and 205, e.g., portion 207 are bonded together thermally to result in soft composite actuator 209, which upon actuation bends in a predetermined fashion (FIG. 2B). The bonding may also be achieved by chemical method, mechanical method, and a combination thereof. One of the advantages of the instant application is that the soft composite actuator described herein can be made without using any mold, thus the manufacture process is greatly simplified. In some embodiments, heat can be applied to two or more material layers, e.g., elastomeric layer and strain limiting layer, to bond the layers together. In other embodiments, mechanical force by hand or machine can be applied to two or more material layers, e.g., elastomeric layer and strain limiting layer, to bond the layers together. In still other embodiments, chemical reactants can be deposited between the material layers or embedded in one or more material layers and a chemical reaction may be initiated to bond the two or more material layers, e.g., elastomeric layer and strain limiting layer, together.

As shown in FIG. 2B, the soft composite actuator 209 contains a bladder formed by the bonding of the perimeters of layers 201 and 203. This bladder (213 in FIG. 2B) is connected to an infusion/vacuum source 211 to infuse pressurized liquid into bladder 213. The fluid-filled bladder has an inside pressure higher than the outside pressure ($\Delta p$) which forces the elastomeric layer 203 and the radially constraining layer 201 to bend towards the strain limiting layer 205.

Thus, as shown in FIGS. 2A-2C, an additional layer, i.e., the radially constraining layer, can be added to create an additional anisotropic response by limiting the radial expansion of the elastic layer. The cutouts (215) on the radially constraining layer allow the elastic layer to expand lengthwise while limiting strain limiting regions or bands 216 limit radial expansion. Restricting the radial swelling of the bladder promotes more efficient bending by supporting linear extension of the elastic layer and limiting radial expansion, which does not promote bending. It should be noted that additional layers could be added to include other functionalities such as super absorbent material to soak up fluids, antibacterial properties, hot therapy, and cold therapy.

The soft composite actuator can be designed and configured to actuate in a predetermined manner upon pressurization of the bladder and/or perform one or more desirable functions. Upon actuation, the soft composite actuator may be designed to generate structural anisotropy or structural isotropy. That is, the soft composite actuator may upon actuation generate the same or different structural changes when measured along different axes of the soft composite actuator.

In some embodiments, the soft composite actuator further includes a second elastomeric layer, and a bladder can be formed by, for example, thermally sealing the edges of the two elastomeric layers. In some embodiments, the strain limiting layer in the soft composite actuator is also a radially constraining layer which limits the radial expansion of the elastomeric layer. These designs are described with reference to FIGS. 2C-2G, which show a linear extending actuator including two radially constraining layers and two elastic layers bonded to form a linear extending actuator.

As shown in FIG. 2C, a first and second elastomeric layers, 223 and 225, respectively, are sandwiched between a first radially constraining layer 217 and a strain limiting layer (i.e., a second radially constraining layer 221). The radially constraining layers 217 and 221 contain cutouts 219 and 227, respectively. After layers 217, 223, 225, and 221 are bonded at their perimeters, e.g., edge 229, to form composite 231, some portions of the soft composite actuator, e.g., portions 235 and 237, can be cut off along the dotted lines shown in FIG. 2D to form soft composite actuator 233. These excess materials from the radially constraining layers 217 and 221 are removed leaving strain limiting strips 243 bonded to the elastic layers. FIG. 2E is a cross-section view of the soft composite actuator 233 without (upper portion of FIG. 2E) and with fluid pressurization (lower portion of FIG. 2E). As shown in FIG. 2E, the soft composite actuator has layers 217, 221, 223, and 225 bonded together at the edge 229. Upon actuation, bladder 239 between layers 223 and 225 is pressurized to generate an inside pressure of $P_1$, which is greater than the outside pressure $P_{atm}$. As a result, the layers of the actuator 233 curve as shown in the lower portion of FIG. 2E.

Figure 2F:
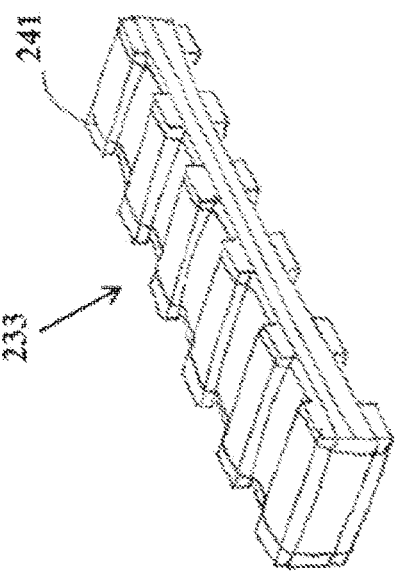

FIG. 2F is a perspective view of the linear extending actuator 233 in an unpressurized state. Edges of the layers, e.g., 241 and 247, are bonded (FIG. 2G). FIG. 2G is a perspective view of the linear actuator 233 in the actuated state extending under fluid pressurization where the strain limiting strips 243 in the radially constraining layer 217, connected by the bond at edge 241, form radially constraining hoops along the length of the actuator, and thus promote linear extension along the direction of axis 245.

FIG. 2H demonstrates that when the orientation of the strain limiting strips 251 run length wise, i.e., along axis 253, the resulting soft composite actuator is a contracting linear actuator 249, (i.e. the largest deformation is contractile). FIG. 2H shows the contracting linear actuator 249 in its unactuated state (upper left corner of FIG. 2H) and actuated state (lower right corner of FIG. 2H).

In certain embodiments, the pressurized fluid is temperature-regulated to deliver hot or cold therapy. For instance, fluidic lines could also be heat stamped into a material layer for delivery hot and/or cold therapy or even medicine.

As shown in FIGS. 2A-2H, the elastomeric layer, the strain limiting layer, and the radially constraining layer may have a planar shape before or during bonding. In some other embodiments, at least of the elastomeric layer, the strain limiting layer, and the radially constraining layer may have a non-planar shape before or during bonding.

In one or more embodiments, one or more layers of the soft composite actuator can be preformed into a non-planar shape before assembly. FIG. 3A is an exploded view of a bending soft composite actuator including layers that are preformed to a particular shape before or during assembly so that the actuator takes on a non-planar profile in its unpressurized state. The soft composite actuator includes the pre-formed radially constraining layer 301, a pre-formed elastic layer 303, and a strain limiting layer 305. These material layers are bonded at the perimeters of the material layers, e.g., perimeter 307 to form a bending soft composite actuator 309 (FIG. 3B). The bladder formed in the actuator 309 is connected to a pressurized fluid source via a tube 311. Other types of connection known in the art are contemplated. FIG. 3B is a perspective view of the assembled bending actuator 309 in its unpressurized state. FIG. 3C is a side view of the bending actuator in a pressurized state. When the actuator 309 is actuated by infusion of pressurized fluid through tube connection 311, radially constraining layer 301 restricts the radial expansion of the elastic layer 303 and actuator 309 bends in a predetermined matter, i.e., towards the direction of strain limiting layer 305.

Thus, in some embodiments, it may be advantageous to pre-form (e.g., thermally form) one or more material layers, e.g., radially constraining layer, first and second composite layers (also referred to anisotropic layer in FIGS. 4A-F), elastic layer, or strain limiting layer, before or during actuator assembly so that an actuator can be designed to achieve a particular thickness (or pressurized profile) under fluid pressurization. In some embodiments, preforming one or more materials is desirable for a soft composite actuator to achieve desired range of motion, stiffness, and force production as these outputs are linked to actuator thickness. Preforming to a non-planar initial state may also place less strain on the material to reach a target state, which in turn, may reduce the required input pressure and material fatigue. Non-limiting examples of the non-planar shapes of the material layers include half cylinder shape (FIGS. 3A-3C), rectangular, tapered, and bellows-shaped. Any material layer of any of the soft composite actuator may be pre-formed.

In another aspect, a soft composite actuator is described, including:

a monolithic, first composite layer comprising one or more first elastomeric sections and one or more first radially constraining sections; and a strain limiting layer, wherein the first composite layer and the strain limiting layer are bonded together to form at least one bladder for holding pressurized fluid.

The first composite layer is located at the top or bottom of the soft composite actuator. In some embodiments, the first elastomeric section, the first radially constraining section, and/or the first composite layer have the same thickness. In these embodiments, the first composite layer can be made by from bonding the first elastomeric sections and the first radially constraining sections together. In other embodiments, the first elastomeric section and the first radially constraining section have different thickness. In these embodiments, the first composite layer and the first elastomeric section may have the same thickness. In some specific embodiments, the first elastomeric section is thicker than the first elastomeric section and/or the first elastomeric section encapsulates the first radially constraining section.

Figure 4A:
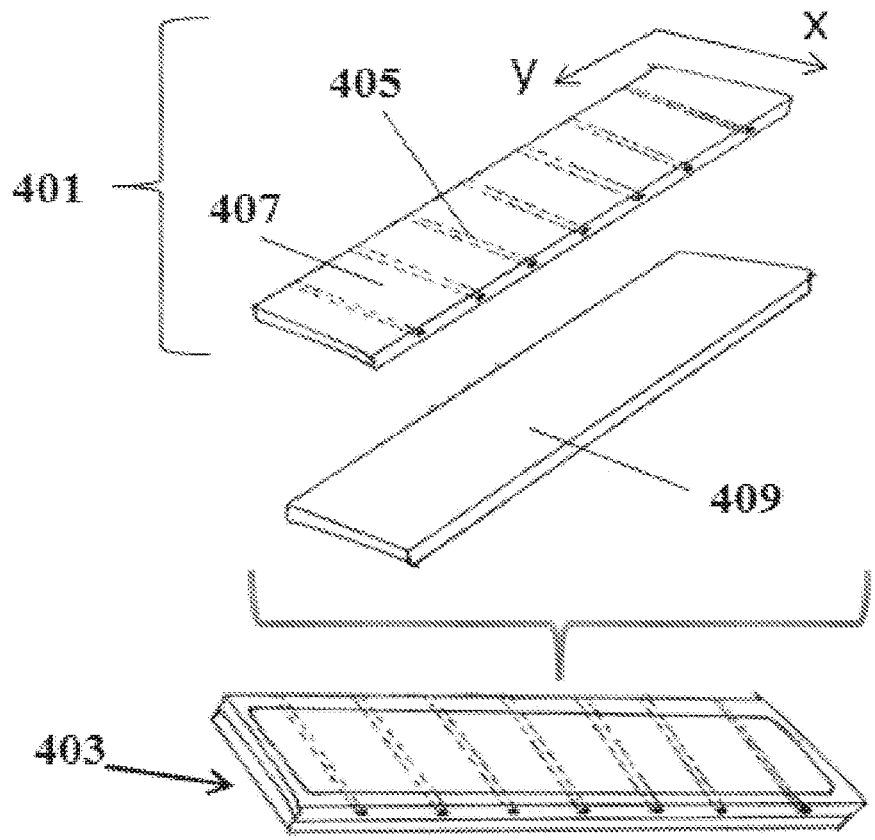
FIG. 4A presents an exploded and assembled view of a bending actuatable device including two layers, where one layer has anisotropic properties such that it prefers to stretch along the y-axis and is strain-limited along the x-axis and the other layer is strain limited in both the x and y direction, according to one or more embodiments described herein.

The soft composite actuator according to this aspect is described with reference to FIGS. 4A-4F. FIG. 4A is an exploded and assembled view of a soft composite actuator 403 capable of bending and including a first composite layer 401. The first composite layer 401 has radially constraining sections 405 made of strain limiting materials and elastomeric section 407 made of elastic materials. Sections 405 and 407 can be in any shape or size and are bonded together by thermal, chemical, and/or mechanical methods to form the monolithic first composite layer 401. Because the first composite layer 401 has different expansion properties or characteristics along the x and y axes (i.e., layer 401 may expand more easily along the y axis than alone the x axis), the first composite layer 401 is also referred to as a monolithic anisotropic layer. As shown in FIG. 4A, sections 405 and 407 both have the same thickness as that of the monolithic layer. The first composite layer is then bonded with a strain limiting layer 409 to form the bending soft composite actuator 403.

Thus, in the embodiments described in FIG. 4A, the first composite layer 401 has anisotropic properties such that it prefers to stretch along the y-axis and is strain-limited along the x-axis. The strain limiting layer 409 is made of strain limiting material and strain-limited is both the x and y directions. The layers are bonded together at the two layers' perimeters such that the bond defines a fluid tight (e.g., airtight or water tight) bladder.

Figure 4B:
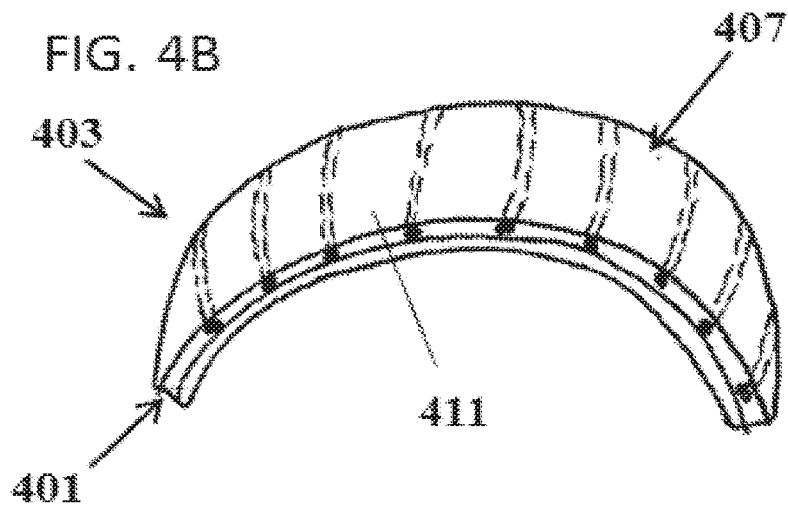
FIG. 4B presents a side view of the two-layer bending actuator under fluid pressurization, wherein the anisotropic layer performs a dual function of promoting linear growth while limiting radial expansion to cause the assembly to bend, according to one or more embodiments described herein.

FIG. 4B is a side view of the bending soft composite actuator 403 upon actuation when the bladder 411 is under fluid pressurization. The anisotropic layer 401 performs a dual function of promoting linear growth of the elastic sections 407 while limiting its radial expansion to cause the assembly to bend.

In some embodiments, the strain limiting layer includes or is a second composite layer comprising one or more second elastomeric sections and one or more second radially constraining sections, wherein the second elastomeric section, the second radially constraining section, and the second composite layer have the same or different thickness, wherein the second composite layer is a monolithic anisotropic layer. Similar to the first composite layer, the second elastomeric section and the second radially constraining section can be bonded together to form the second composite layer. Alternatively, the second radially constraining section may be encapsulated in the second elastomeric section. The radially constraining sections may be evenly or unevenly distributed in the composite layer. In some embodiments, the radially constraining sections comprise radially constraining strips oriented parallel to one of the edges of the composite layer or at an angle to one of the edges of the composite layer. The angle (θ) can be in any ranges or have any values. In some embodiments, θ is about 10, 20, 30, 40, 45, 50, 60, 70, 80 degree, or in any ranges bound by any two of the values disclosed herein. The soft composite actuator according to these embodiments is described with reference to FIGS. 4C-4D.

Figure 4C:
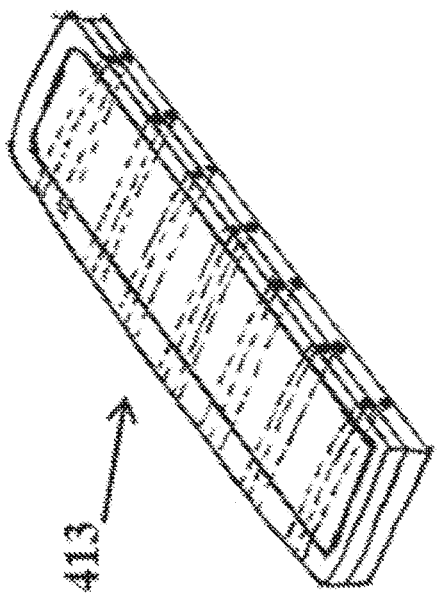
FIG. 4C is a perspective view of an assembled linear-extending actuator including two anisotropic layers bonded together to form an airtight (or water tight) bladder, according to one or more embodiments described herein.

FIG. 4C is a perspective view of an assembled linear extending soft composite actuator 413 which consists of two anisotropic layers 415 and 417 bonded together to form an airtight (or water tight) bladder. The first composite layer 415 contains radially constraining sections 421 made of strain limiting materials and elastomeric section 419 made of elastic materials. Sections 419 and 421 are bonded together by thermal, chemical, and/or mechanical methods to form the monolithic first composite layer. Sections 419 and 421 both have thickness the same as that of the first composite layer 415.

The strain limiting layer 417 in FIG. 4C is also a second composite layer containing radially constraining sections 425 made of strain limiting materials and elastomeric section 423 made of elastic materials. Sections 423 and 425 are bonded together by thermal, chemical, and/or mechanical methods to form the monolithic first composite layer. Sections 423 and 425 both have thickness the same as that of the first composite layer 417.

Figure 4D:
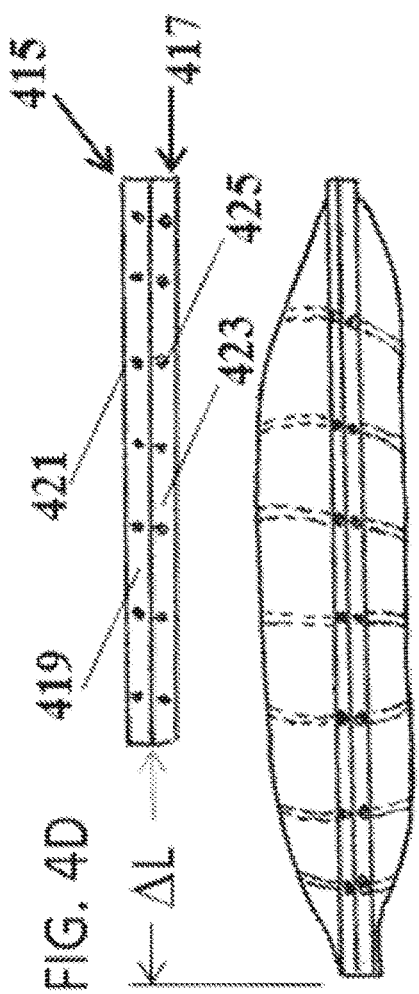
FIG. 4D is a side view of the linear-extending actuator under fluid pressurization where the strain limiting portions of the anisotropic layer form hoops that limit radial expansion and promote linear extension, according to one or more embodiments described herein.

Both layers 415 and 417 are anisotropic layers. FIG. 4D is a side view of the linear extending actuator 413 before actuation (top portion of FIG. 4D) and under fluid pressurization (lower portion of FIG. 4D) where the strain limiting sections (421 and 425) of the anisotropic layers 415 and 417 form hoops that limit radial expansion and promote linear extension. As shown in FIG. 4D, upon actuation the actuator extends a distance of ΔL.

Thus, in these embodiments described above, the complexity of bonding multiple material layers can be reduced by creating the desired anisotropic properties into a single layer, e.g., the first or second composite layer. The strain limiting sections (made of a strain limited material such as fibers, thread, non-woven materials, higher duromoter materials, etc.) can be combined with the elastic sections to create a single, monolithic layer that is more elastic in one direction (e.g., y-direction in FIG. 4A) over another (e.g., x-direction in FIG. 4A). When this anisotropic layer is bonded to the strain limited layer the result is a bending actuator constructed from only two material layers. The anisotropy contained in a single layer can be achieved several ways including molding or encapsulating the strain limited material in the elastic material, heat stamping the strain limited material together with the elastomer, sandwiching two elastomer films around the strain limited material, or cast extruding elastic and strain limiting materials together. Furthermore, adjusting the spacing and orientation of the elastic and strain limiting materials in the anisotropic layer can enable the soft actuator to combine multiple actuations in series such as stiffening sections, bending sections, linear extending sections, linear extending and twisting, and bend-twist sections (see, e.g., FIG. 5A for an example actuator with stiff sections and bending sections). Similarly, the anisotropic layer can be bonded with another anisotropic layer to make a linear actuator (extending and contracting).

FIGS. 4A-F show that the direction of expansion can be controlled by combining elastic material and strain limiting material into one monolithic layer, which contains the elastomeric sections and the radially constraining sections. In some embodiments, the elastomeric sections and the radially constraining sections are cast extruding together, or embed fiber reinforcements could be used to create the strain limiting property. The various applications and variations described with particularity for the multilayer versions of the composite layer actuator can also be achieved using the combined elastomer/strain limiting material arrangement in a monolithic layer.

In some embodiments, the radially constraining section comprises a radial strain strip oriented parallel to one of the edges of the first or second composite layer (see, e.g., FIGS. 4A and 4C).

In other embodiments, the radially constraining section comprises a radial strain strip oriented at an angle to one of the edges of the composite layer. For instance, FIG. 4E is an exploded and assembled view of a soft composite actuator 427 capable of bending and twisting under fluid pressurization. As illustrated in FIG. 4E, a monolithic first composite layer 433 is provided, containing radially constraining sections 431 made of strain limiting materials and elastomeric sections 429 made of elastic materials. Sections 431 and 429 are bonded together by thermal, chemical, and/or mechanical methods to form the monolithic first composite layer 433. Sections 429 and 431 both have thickness the same as that of the first composite layer 433. As shown in FIG. 4E, the radially constraining section 431 is in the form of a radially constraining strip, which is oriented in an angle (θ) with respect to the layer 433's horizontal edge (shown as the y axis). θ can be in any ranges or have any values. In some embodiments, θ is about 10, 20, 30, 40, 45, 50, 60, 70, 80 degree, or in any ranges bound by any two of the values disclosed herein. The angled elements, e.g., 431 or 429, in the anisotropic layer 433 can be evenly spaced, intermittently spaced, and/or at a gradient of angles. Angling the elastic and strain limited elements in the anisotropic layer promotes linear growth at an angle to the y-axis. As a result, when layer 433 is combined with a strain limiting layer, e.g., 435, the resulting actuator 427 will simultaneously bend and twist upon actuation.

FIG. 4F is an exploded and assembled view of an actuatable device capable of linear extension and twisting under fluid pressurization by bonding two anisotropic layers with angled elastic and strain limiting elements. A first composite layer 439, containing radially constraining sections 445 (with an angle θ with respect to the layer 439's horizontal edge) and elastic sections 443, is combined with a second composite layer 441, which contains similar elastic section 447 and radially constraining section 449, to form a soft composite actuator 437. When actuated, soft composite actuator 437 extends linearly and twists.

In some embodiments, the soft composite actuator stiffens when actuated and thus can be termed a stiffener. FIG. 5A shows the top view of an unactuated stiffener soft composite actuator 501 (top portion of FIG. 5A) and the response of the actuator when actuated (bottom portion of FIG. 5A) under fluid pressurization. The radially constraining layer 523 of the actuator 501 contains cutout section 505 and solid sections 503. In this arrangement, the cut outs define areas where the actuator is allowed to bend and the solid sections, e.g., 503, of the radially constraining layer restrict any actuation by inflating to form a pressurized tube termed a stiffener.

Figure 5B:
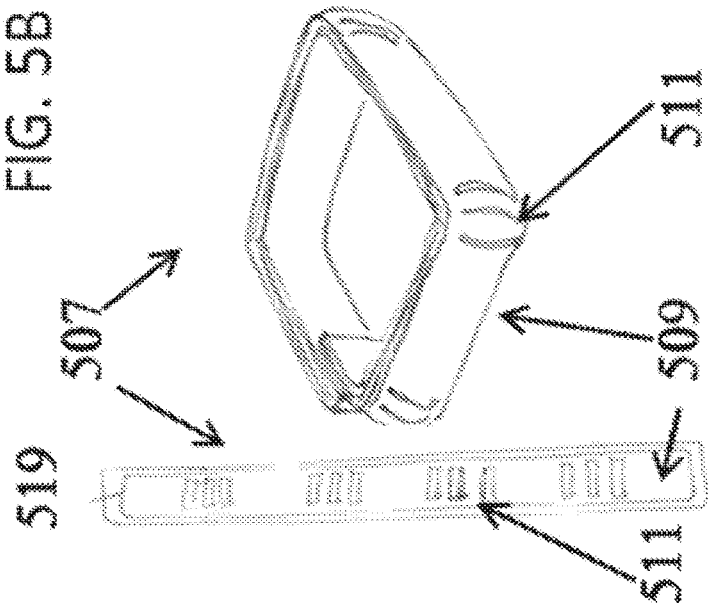
FIG. 5B is an extension of FIG. 5A demonstrating that several joints can be designed into a single actuator to form a closed shape, according to one or more embodiments described herein.
Figure 5A:
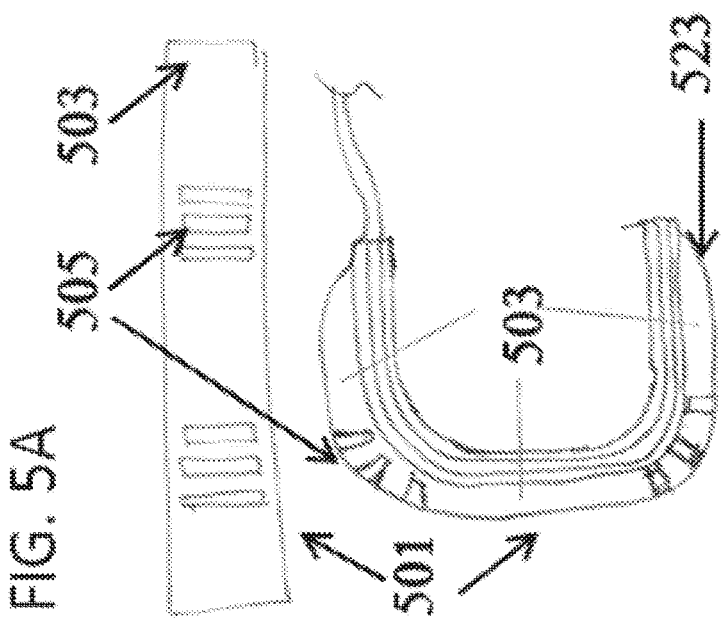
FIG. 5A shows the profile of a radially constraining layer (top) and the response of the actuator (bottom) under fluid pressurization, according to one or more embodiments described herein.

FIG. 5B is an extension of FIG. 5A demonstrating that several bending joints 511 can be designed into a single actuator. In this illustration, the actuator 507 contains solid sections 509 (which stiffen upon actuation) and cutout sections 511 (which allow the actuator to bend during actuation) in its radially constraining layer 519. As a result, this closed loop actuator 507 could be used to wrap around an object or to create an opening.

Figure 5C:
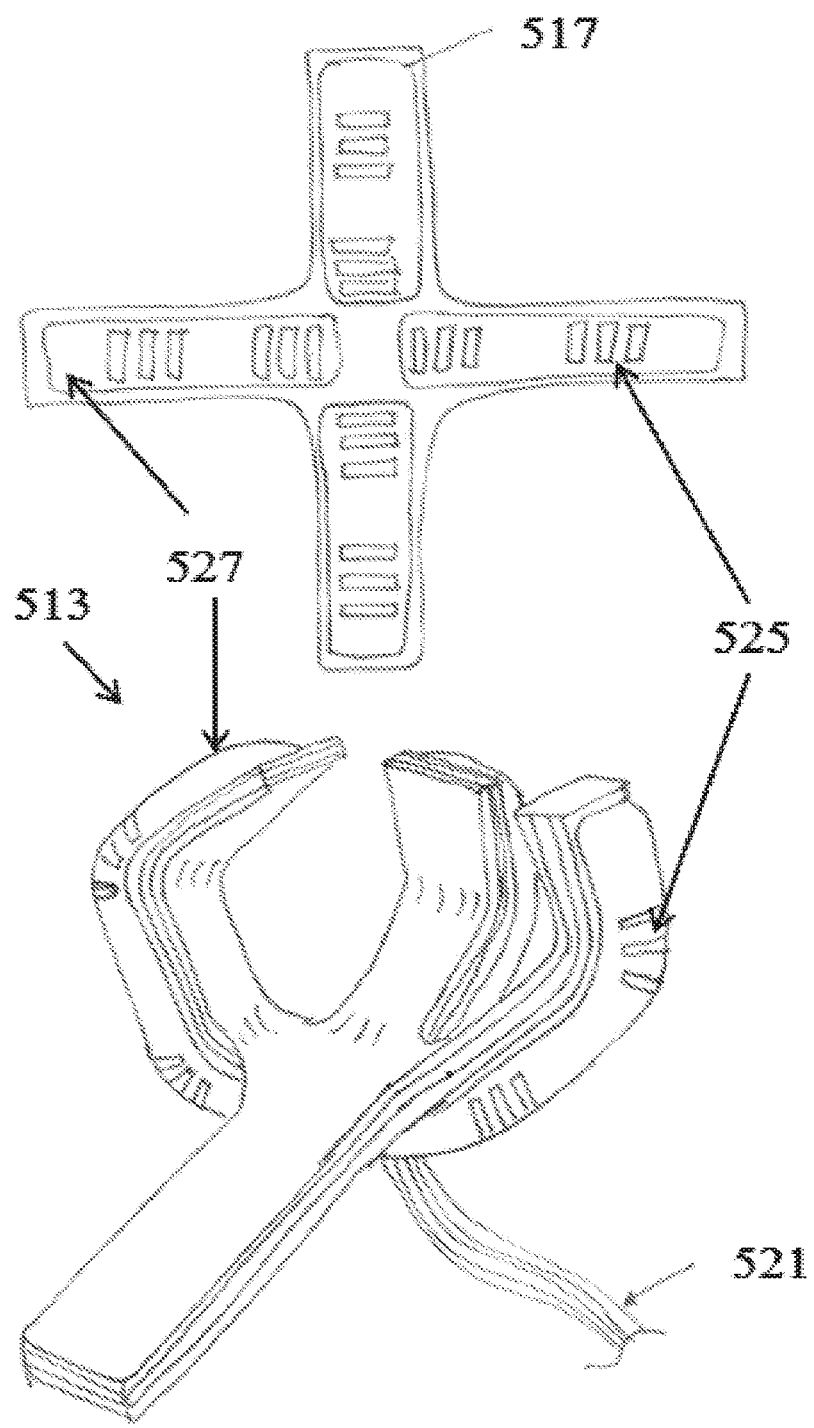
FIG. 5C is an extension of FIG. 5A, demonstrating that multiple bending actuators can be combined on a single laminate, according to one or more embodiments described herein.

FIG. 5C is an extension of FIG. 5A demonstrating that multiple bending actuators can be combined on a single laminate. In this figure, actuator 513 contains four individual bending actuators which are arranged to form a grasping device. The actuator 513 has a radially constraining layer 517 which contains openings, e.g., cutout sections 525 and solid sections 527. The bottom portion of FIG. 5C shows the scenario where three digits are activated when the bladder of the actuator is connected to a pressurized fluid source via a tubing connection, while one is not connected to the pressurized fluid source or is connected to a different pressurized fluid source. In this figure, four individual bending actuators are arranged to form a grasping device. As a result, the three digits and the fourth digit can be controlled separately.

The locations of the openings, e.g., cutout sections and solid sections can be adjusted and arranged in any predetermined matter to achieve a desired actuation, e.g., any preferred ranges of motion or shapes of the actuated actuator. For example, as shown in FIG. 4E-4F, the radially constraining sections can be arranged to be in an angle with respect to the edge of the material layers of the actuator, which can produce simultaneous bending and twisting motion (not illustrated).

Figure 6B:
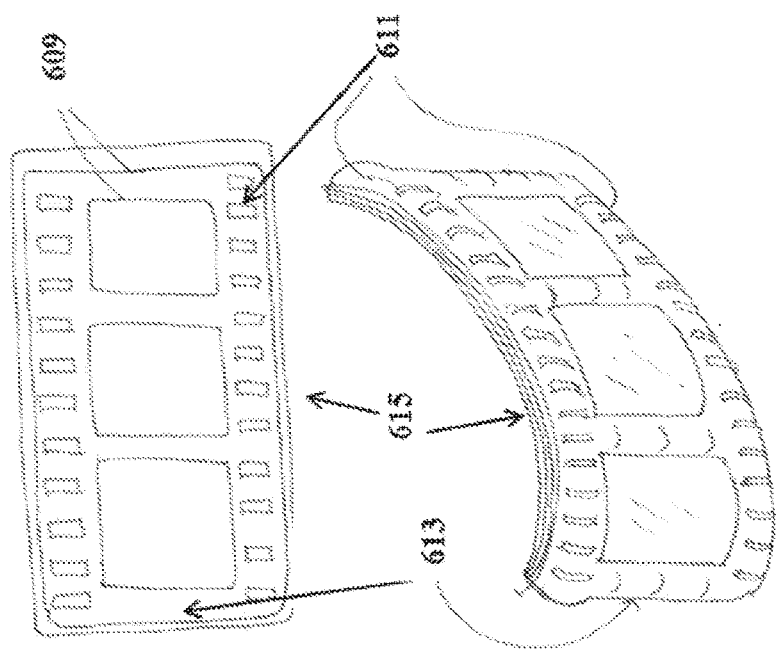
FIG. 6B is an extension of FIG. 6A where multiple stiffeners can be used to support bending actuators and achieve greater coverage, according to one or more embodiments described herein.
Figure 6A:
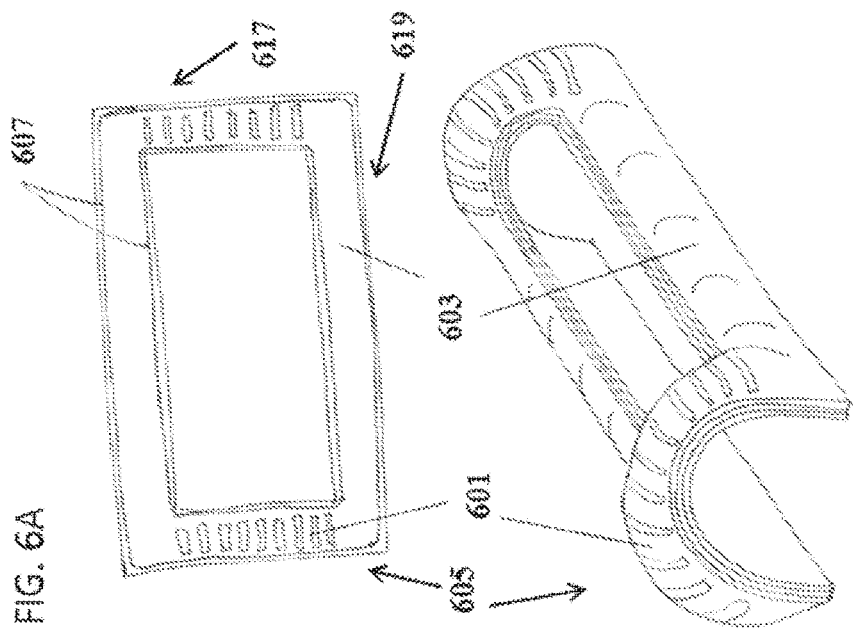
FIG. 6A depicts a top view and an isometric view of an actuatable device that combines a multiple functions onto a single laminate, where two bending actuators are connected via two stiffeners, according to one or more embodiments described herein.

FIG. 6A depicts a top view and an isometric view of an actuatable device 605 that combines a multiple functions onto a single laminate. In this figure, two bending actuators 601 (having cutouts in its radially constraining layers) are connected via two stiffeners 603 (having solid sections in its radially constraining layers). The material layers of the actuator are bonded at perimeters such as 607. Thus, on a single sheet, multiple functions can be achieved by using a single bladder. In FIG. 6A, the rectangular profile of the actuator 605 has a perimeter thermal bond and a second bond offset a certain distance inward (shown as 607). On two vertical sides (617) of the rectangle the radially constraining layer has openings, e.g., cutouts that define a bending actuator while on the other two sides, i.e., the horizontal sides 619, the radially constraining layer has no openings, e.g., cutouts, which under fluid pressurization becomes a stiff inflated tube that can be used to as a structural element.

FIG. 6B shows an actuator device 615 having multiple stiffeners used to support bending actuators and achieve greater coverage. In this figure, two bending actuators 611 (having cutouts in its radially constraining layers) are connected via four stiffeners 613 (having solid sections in its radially constraining layers). The material layers of the actuator are bonded at perimeters such as 609. In this embodiment, the actuator can be used to generate a bending motion with greater coverage. For example this could be used as a splint that can conform to the leg while also providing stability (i.e. stiffness) along the length of the injury. In some embodiments, the single bladder of the actuator can be separated into multiple bladders for more control over each function of each section of the actuator device. For example, the stiffeners may need to be separate bladders from the bending actuator because they may operate at different pressures.

In some embodiments, the soft composite actuator further comprises one or more rigid elements attached to the strain limiting layer. Rigid elements could be added to actuator body to define discrete bending points or to rigidize certain lengths for improved force transmission or stability. In some embodiments, rigid elements also enable a tighter bending radius of curvature and can be used as mounting substrate for auxiliary equipment.

FIG. 7A depicts an exploded view and cross-section view of an actuatable device 713 that incorporates rigid elements as an additional layer. Soft actuator 713 contains a radially constraining layer 701, an elastic layer 703, a strain limiting layer 705, and a rigid element layer 707 containing rigid elements 709. These layers are stacked and bonded together to provide the actuator 713.

FIG. 7B is a side view of the bending actuator 713 under fluid pressurization with rigid elements where it only bends at the gaps between the rigid elements, e.g., position 715. FIG. 7B shows the actuator 713 with the four layers 701, 703, 705, and 707 described above in FIG. 7A. Upon actuation, a portion of the elastic layer 711 may expand through the openings, e.g., cutouts in the radially constraining layer 701. In some embodiments, the space between the rigid elements may be increased to increase the radius of curvature.

The soft composite actuator as described herein may have a variety of functions. In some embodiments, the soft composite actuator is configured to open an incision, move, displace organs, muscle, and/or bone, brace a joint, be worn to support joint movements, shape-match an object, fold pre-defined bending joints to create origami-like structures, achieve a sufficient grasp over the object, or create a padded layer conformal to the object.

In some embodiments, one of the material layers, e.g., the elastic layer, is pre-strained before being bonded to the radially constraining layer and/or the strain limiting layer. Pre-straining the elastic layer could be used to create a bimorph bending actuator. This could be used as a way to make graspers that are low profile when unpressurized and can conform around an object when pressurized. Any other type of material layer can be pre-strained as well.

Figure 8A:
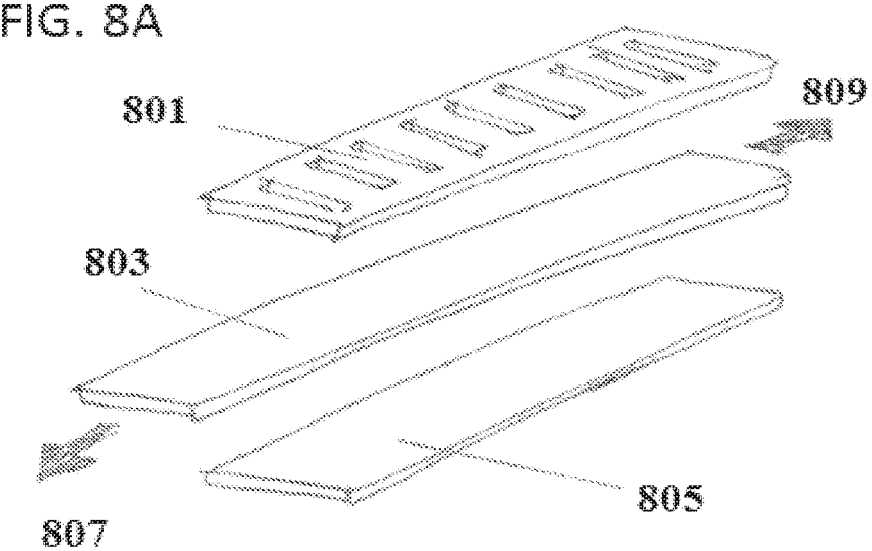
FIG. 8A is an exploded view of a bimorph bending actuator that consists of a single bending actuator and incorporates a pre-strained layer during the assembly, according to one or more embodiments described herein.
Figure 8B:
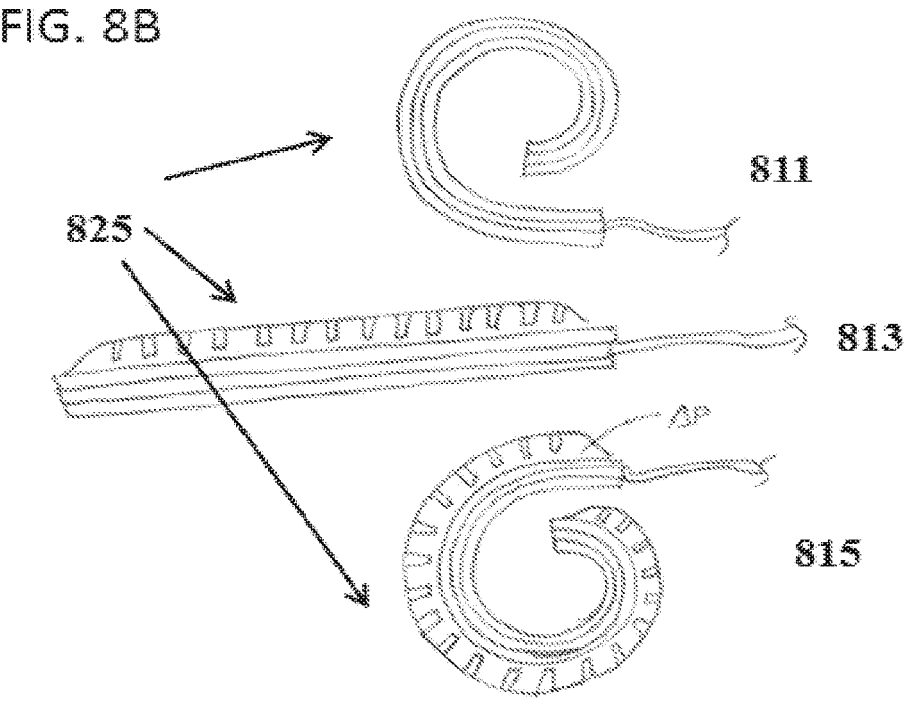
FIG. 8B shows the range of motion of the bimorph bending actuator at different stages of pressurization, according to one or more embodiments described herein.

FIG. 8A shows the assembly of a bimorph bending actuator that incorporates a pre-strained layer during the assembly. The elastic layer 803 is pre-strained along the directions of 807 and 809, before being bonded to the radially constraining layer 801 and the strain limiting layer 805. FIG. 8B shows the range of motion of the bimorph bending actuator 825 at different stages of pressurization. Under no fluid pressurization (state 811), the pre-strained elastic layer causes the actuator 825 start in a curled position. Under partial fluid pressurization (state 813), the actuator 825 uncurls and straightens out. When the actuator is fully pressurized (state 815), it curls to the opposite side.

FIG. 8C illustrates that the opposing bimorph bending actuators can be used to form a grasper 827. At the unpressurized state 817, the grasper curls and does not grab object 823. At the partially actuated state 819, the grasper 827 only partially grabs object 823. Finally, when the grasper 827 is fully pressurized (state 821), object 823 is tightly surrounded by the grasper 827. Similarly a bimorph bending actuator can also be created with two opposing bending actuators that are bonded together (or share the same strain limiting layer).

In some embodiments, the soft composite actuator is a multi-degree-freedom bending actuator. In some specific embodiments, the degree of the actuation, e.g., bending of the soft composite actuator may be controlled and fine-tuned by the fluid pressure inside the bladder. In some embodiments, the soft composite actuator is attached to one or more pneumatic or hydraulic connections. For instance, the pneumatic or hydraulic connections connected to the bladder, e.g., a fluid pump, may apply different pressures to the fluid so result in different degrees of actuation, e.g., bending.

FIGS. 9A-9C are an extension of FIG. 4C where multiple linear extending actuators can be grouped on the same laminate to form a multi-degree of freedom bending and extending actuator. In these figures, two anisotropic layers (first composted layer 901 and second composite layer 903 in FIG. 9B) are bonded together at locations shown as 911 such that they form three different bladders, 905, 907, and 909. Each of the first and second composite layers has elastic sections 913 and radially constraining sections 915. After bonding, three linear actuators, 917, 919, and 921 are formed.

FIG. 9B is an end view of FIG. 9A (upper portion of FIG. 9B) and depicts the next stage in the fabrication of a multi-degree of freedom bending and extending actuator where the laminate is bonded end to end to form a tube shape (lower portion of FIG. 9B) at end 923.

FIG. 9C illustrates that when one bladder of the actuator is selectively pressurized it will linearly extend causing the tube structure to bend to an angle θ (scenario 927). Fluid pressurization of one or more chambers/bladders causes bending and some linear extension. On the other hand, equal pressurization of the all the bladders will cause the actuator to only extend linearly (scenario 929). Note that in scenario 927, only one of the bladders is pressurized to have a pressure $P_1$, which is greater than the outside atmosphere pressure. In scenario 929, all of the three bladders are equally pressurized to have pressures $P_1$, $P_2$, and $P_3$, which are greater than the outside atmosphere pressure.

In some embodiments, the soft composite actuator as described herein may be used for stabilizing a limb. In some embodiments, the soft composite actuator is part of a splint or is the splint. In other embodiments, the soft composite actuator is part of a grasper comprising a plurality of digits, or is grasper.

Figure 10:
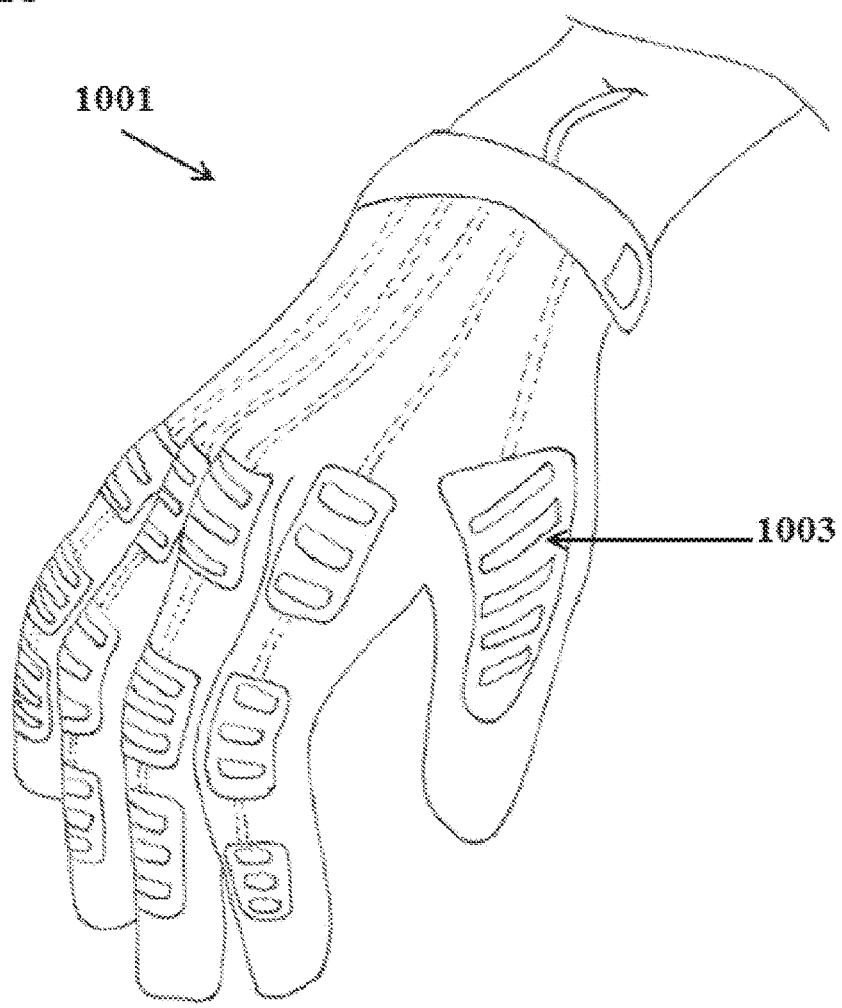
FIG. 10 is a perspective view of a wearable application where soft actuators have been incorporated into a glove to assist joint motions, according to one or more embodiments described herein.

FIG. 10 is a perspective view of a wearable application where soft actuators have been incorporated into a glove 1001 to assist joint motions. The glove 1001 contains cutouts 1003 in its radially constraining layer to accommodate the finger joint bending. The material layer-bonding approach enables the integration of a network of soft actuators that can apply torques to finger joints to support hand closing. A similar configuration on the palm side could assist opening the hand. With this approach, the material layers can serve a dual function of forming the actuators and serving as the glove material.

In some embodiments, one of material layers, e.g., the elastomeric layer, the strain limiting layer, the first and second composite layer (described below), and/or the radially constraining layer, is configured to have one or more functions selected from the group consisting of absorbing fluids, transmitting light, changing color or luminescence, embedding a soft sensor, embedding a medical patch, embedding at least a part of an electronic circuit, embedding a heating element, and a combination thereof.

FIG. 11 is perspective view of a material layer described herein demonstrating multi-functionality. In some embodiments, any of the material layers described herein can incorporate electronics, heating elements, sensors, and so forth. As shown in FIG. 11 (left portion), a heating element 1105 may be incorporated into a material layer 1101, e.g., a strain limiting layer. Also shown in FIG. 11 (right portion), a circuit board or electronic element 1107 can be incorporated (e.g., printed) into a material layer 1103, e.g., a strain limiting layer. Any of the material layers described herein can have sensing capabilities by incorporating flex sensors, inertial measurement units (IMUs), or soft sensors into the material layers.

Figure 12:
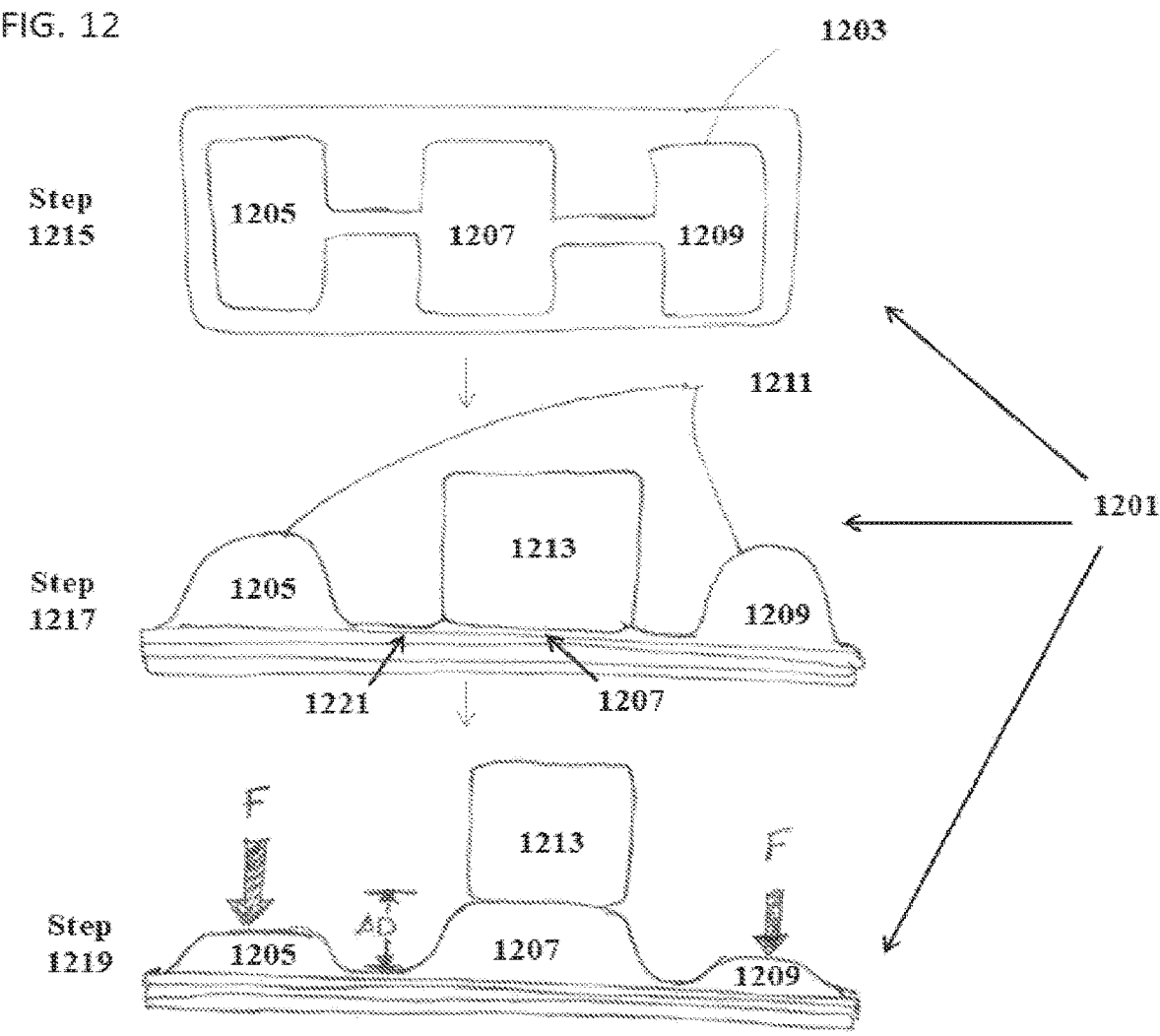
FIG. 12 shows a sequence of side views of an actuatable device that uses connected pressurized bladders to transmit force, according to one or more embodiments described herein.

FIG. 12 shows a sequence of side views of an actuatable device 1201 that uses connected pressurized bladders to transmit force to lift an object. In step 1215, the actuator 1201 is formed by bonding multiple material layers at locations such as 1203. The actuator 1201 has three bladders, 1205, 1207, and 1209, which are in fluidic communication with one another. In step 1217, a heavy object 1213 is placed on bladder 1207 and pressurized fluid 1211 is infused into the bladders. Bladders 1205 and 1209 expand however bladder 1207 does not expand due to the gravity force of object 1213. In step 1219, force F is applied onto bladders 1205 and 1209. The force F can be applied by human or mechanical means. As a result, pressurized fluid is forced into bladder 1207 and causes bladder 1207 to expand and at the same time, move object 1213 upwards for a distance ΔD. Thus, the flexible nature of the material layers enables the bladder to operate in non-planar scenarios and the fluid therein can be passed through a narrow opening, e.g., opening 1221.

In some embodiments, the soft composite actuator described herein can be prepared by bonding a portion of a pre-stacked laminate containing all the material layers required for the soft composite actuator. The material layers may be pre-stacked or rolled into a multi-layer laminate. When in use, a desired size of the laminate may be removed, e.g., cut, and bonded to form the soft composite actuator. In some embodiments, two or more portions of the laminate can be cut and bonded together to form a soft actuating device including two or more soft actuators descried herein.

In some embodiments, the pre-stacked laminate comprising a first elastomeric laminate layer, a strain limiting laminate layer, and a first radially constraining laminate layer. A portion of the laminate is separated to provide the first elastomeric layer, the strain limiting layer, and the first radially constraining layer stacked together. These layers may then be bonded together to provide a soft composite actuator described herein.

In some embodiments, the pre-stacked laminate comprising a monolithic, first composite and a strain limiting laminate layer. A portion of the laminate is separated to provide the first composite layer and the strain limiting layer stacked together. These layers may then be bonded together to provide a soft composite actuator described herein.

FIG. 13A shows a sequence of images where a rolled sheet of actuatable devices can be cut to a desired length and the bladders can be resealed with a sealing tool. In step 1301, a plurality of material layers bonded at locations such as 1311 are rolled into a roll. During use, a desired portion of the roll can be cut. The newly cut edge can be sealed using a sealing tool 1313 (step 1303). The cut portion can be further divided as shown in step 1305, where the sealed edge 1319 remains sealed.

FIG. 13B illustrates how the cut portion of the material layer roll can be assembled together to form a range of different actuatable devices. In step 1307, bending actuator 1321 (which contains cutouts 1315 in its radially constraining layer) and bending actuator 1325 (which contains cutouts 1327 in its radially constraining layer) are joined together to a stiffening actuator 1323 (which contains solid strain limiting sections 1317 in its strain limiting layer). In step 1309, the resulting actuator device 1329 is actuated where the bending portions (1321 and 1325) of the device bend, while the stiffening portion (1323) is stiffened. These illustrations present concepts where sheets of any soft actuator described herein, e.g., bending, linear extending, contracting, bend/twist, and stiffening actuators, can be cut to length, sealed, and assembled into a range of configurations.

In certain embodiments, a packaging for holding the soft composite actuator's material layer sheet can safely transmit the thermal bonding pattern without comprising the integrity of the package seal. In some embodiments, the soft composite actuator's material layers, e.g., the elastomeric layer, the strain limiting layer, the radially constraining layer, the first composite monolithic layer, and/or the second composite monolithic layer, are contained in a package. Bonding of portions of at least two layers can be achieved by external means without the compromise of the package to form the soft composite actuator with predetermined shape. In some embodiments, the portions of at least two layers are bonded by an external heat source that passes through the packaging. In other embodiments, the package further comprises a heating element and bonding is achieved by heat generated from the activated heating element. Non-limiting examples of heating element include induction heating, chemical reaction heating, or electrical heating elements such as nichrome wire, graphite, and so forth.

FIG. 14 depicts a process by which the bladders of actuatable devices can be defined while the layers of the laminate are contained within packaging (both sterile and non-sterile). The figure depicts packaging that can safely transmit the thermal bonding pattern without reducing the integrity of the package seal. This concept presents a solution to meeting inventory needs. In step 1407, a sterile (or non-sterile) packaging 1403 holds the material layer sheet 1401 to be thermally bonded. The face of the packaging may contain a bonding pattern 1405. In step 1409, a bonding device is used to thermally (or chemically or mechanically) bond the desired bladder along the thermal bonding pattern 1413 labelled on the face of the packing. Thus, in step 1409, thermal bond pattern (a rectangle in this case) has been transferred to the contents of the package while still maintaining the sterility of the package contents. When the soft composite actuator 1415 is needed, it is removed from the packaging (step 1411).

In yet another aspect, a method of actuation is described, including:

providing a soft composite actuator of any of the embodiments described herein; and pressurizing the bladder with a fluid, wherein the soft composite actuator actuates in a predetermined manner.

In some embodiments, the material layers are arranged and bonded to create structural anisotropy. In some embodiments, actuation of the soft composite actuator achieves one or more motions selected from the group consisting of bending motion, combination bending, twisting motion, linear extension, a combination of linear extension and twist, linear contraction, a combination of linear contraction and twist, and any combination thereof. In some specific embodiments, the soft composite actuator stiffens upon fluid pressurization. The bladder may be inflated to different pressures to achieve a tunable stiffness surface. The different pressures may be controlled or tuned by the external pressurized fluid source.

In yet another aspect, a soft actuating device is described, including a plurality of the soft composite actuators described in any of the embodiments herein. The plurality of the soft composite actuators may be connected to the same fluid source, or to two or more different fluid source. In certain embodiments, the soft actuating device includes a first and a second soft composite actuators described in any of the embodiments herein. The first soft actuator may be connected to a first pressurized fluid source and the second soft actuator may be connected to a second pressurized fluid source. Thus, the first and the second soft composite actuators may be actuated separately or alternately, by alternately actuating the first and second fluid sources. In some specific embodiments, the first soft actuator is a stiffener described herein. In some specific embodiments, the second soft actuator is a bending actuator described herein. Thus, the soft actuating device may be controlled to enable different motions, e.g., bending or stiffening, by actuating different fluid sources connected to the bladders of the individual soft composite actuators in the soft actuating device.

In yet another aspect, a method of making a soft composite actuator according to any of the embodiments described herein is disclosed, including:

providing a first elastomeric layer, a strain limiting layer, and a first radially constraining layer; wherein the elastomeric layer is disposed between the radially constraining layer and the strain limiting layer; and bonding the first elastomeric layer, the strain limiting layer, and the first radially constraining layer to form sealed parameters defining at least one bladder for holding pressurized fluid.

In some embodiments, providing a first elastomeric layer, a strain limiting layer, and a first radially constraining layer comprises providing a pre-stacked laminate comprising a first elastomeric laminate layer, a strain limiting laminate layer, and a first radially constraining laminate layer; and separating part of the laminate to provide the first elastomeric layer, the strain limiting layer, and the first radially constraining layer stacked together. Thus, the material layers of the soft composite actuator may be pre-stacked and cut and bond when needed.

In yet another aspect, a method of making a soft composite actuator according to any of the embodiments described herein is disclosed, including:

providing the first composite layer described herein and the strain limiting layer; and bonding portions of the first composite layer and the strain limiting layer to form sealed parameters defining at least one bladder for holding pressurized fluid. In some embodiments, the strain limiting layer includes a second composite layer described herein.

In some embodiments, providing the first composite layer and the strain limiting layer comprises: providing a pre-stacked laminate comprising a first composite laminate layer and a strain limiting laminate layer; and separating part of the laminate to provide the first composite layer and the strain limiting layer stacked together.

The bonding may be achieved by a method selected from the group consisting of thermal method, chemical method, mechanical method, and a combination thereof. In some embodiments, the method further includes removing excess material from the soft composite actuator after bonding.

In yet another aspect, a method of using the soft actuator of any one of the embodiments for one or more functions is described, wherein the function is selected from the group consisting of distribute forces, mixing material, handling material, lifting, grasping, steering a photovoltaic cell or a mirror, steering material on a surface.

In some embodiments, steering material on a surface comprises moving liquid around or moving a solid object.

While for purposes of illustration, embodiments of this invention have been shown and described, other forms thereof will become apparent to those skilled in the art upon reference to this disclosure and, therefore, it should be understood that any such departures from the specific embodiment shown and described are intended to fall within the spirit and scope of this invention.

The invention claimed is:

1. A method comprising:
providing a first elastomeric layer, a second elastomeric layer, a first radially constraining layer, and a second radially constraining layer; wherein the first elastomeric layer and the second elastomeric layer are disposed between the first and second radially constraining layers; and
bonding the first and second elastomeric layers and the first and second radially constraining layers at perimeters to form a seal forming at least one bladder for holding a pressurized fluid,
wherein the bonding is selected from the group consisting of thermal bonding, chemical bonding, mechanical bonding, and combinations thereof.

2. The method of claim 1, wherein bonding the first and second elastomeric layers and the first and second radially constraining layers at perimeters forms a soft actuator.

3. The method of claim 2, wherein the at least one of the first radially constraining layer and the second radially constraining layer contains one or more cutouts configured to achieve actuation.

4. The method of claim 3, further comprising removing portions of the first radially constraining layer and the second radially constraining layer to create one or more strain limiting strips bonded to the first elastomeric layer and the second elastomeric layer.

5. The method of claim 4, wherein the strain limiting strips run parallel to a long axis of the soft actuator.

6. The method of claim 2, wherein the soft actuator is a linear-contracting soft actuator.

7. The method of claim 4, wherein the strain limiting strips run perpendicular to a long axis of the soft actuator.

8. The method of claim 2, wherein the soft actuator is a linear-extending soft actuator.

9. The method of claim 1, wherein the first elastomeric layer, the second elastomeric layer, the first radially constraining layer, and the second radially constraining layer are contained in a package.

10. The method of claim 9, wherein bonding is achieved by external heat passing through the packaging or internal heat generated by a heating element inside the packaging without compromising the package.

11. The method of claim 1, wherein the elastomeric layer is in a pre-strained state before bonding.

12. The method of claim 1, wherein one or more of the first elastomeric layer, the second elastomeric layer, the first radially constraining layer, and the second radially constraining layer have a non-planar shape before or during bonding.

13. The method of claim 1, wherein the pressurized fluid is temperature-regulated for hot or cold therapy.

14. The method of claim 1, further comprising removing portions of the first and second radially constraining layers not bonded to the first and second elastomeric layers.

* * * * *